US011422984B2

(12) United States Patent
Portisch et al.

(10) Patent No.: US 11,422,984 B2
(45) Date of Patent: Aug. 23, 2022

(54) CLUSTERING WITHIN DATABASE DATA MODELS

(71) Applicant: SAP SE, Walldorf (DE)

(72) Inventors: Jan Portisch, Bruchsal (DE); Sandra Bracholdt, Dielheim (DE); Björn Pantel, Wiesbaden (DE); Volker Saggau, Bensheim (DE)

(73) Assignee: SAP SE, Walldorf (DE)

( * ) Notice: Subject to any disclaimer, the term of this patent is extended or adjusted under 35 U.S.C. 154(b) by 639 days.

(21) Appl. No.: 16/399,363

(22) Filed: Apr. 30, 2019

(65) Prior Publication Data
US 2020/0349128 A1 Nov. 5, 2020

(51) Int. Cl.
*G06F 16/21* (2019.01)
*G06F 16/28* (2019.01)
*G06F 16/907* (2019.01)

(52) U.S. Cl.
CPC ......... *G06F 16/212* (2019.01); *G06F 16/285* (2019.01); *G06F 16/907* (2019.01)

(58) Field of Classification Search
CPC ..... G06F 16/212; G06F 16/907; G06F 16/285
See application file for complete search history.

(56) References Cited

U.S. PATENT DOCUMENTS

| 9,819,685 | B1* | 11/2017 | Scott | H04L 63/104 |
| 2008/0263022 | A1* | 10/2008 | Kostorizos | G06F 16/951 |
| | | | | 707/999.005 |
| 2014/0075002 | A1* | 3/2014 | Pradhan | H04L 67/306 |
| | | | | 709/223 |
| 2016/0357787 | A1 | 12/2016 | Kolata et al. | |

\* cited by examiner

*Primary Examiner* — Kannan Shanmugasundaram
(74) *Attorney, Agent, or Firm* — Klarquist Sparkman, LLP

(57) ABSTRACT

A method for data model clustering is provided herein. A first representation of a data model may be received. Edge betweenness values may be determined for respective nodes in the first representation. At least one node in the first representation may be identified as a linking node based on the respective edge betweenness values. One or more linking nodes may be removed from the first representation, thereby forming at least a first cluster and a second cluster. Degrees for the respective remaining nodes may be calculated. Respective hub nodes may be identified for the respective clusters based on the respective degrees in the clusters. Respective descriptions may be generated for the respective clusters based on the respective hub nodes. A clustered representation of the first representation may be stored with the clusters and their respective descriptions.

24 Claims, 27 Drawing Sheets

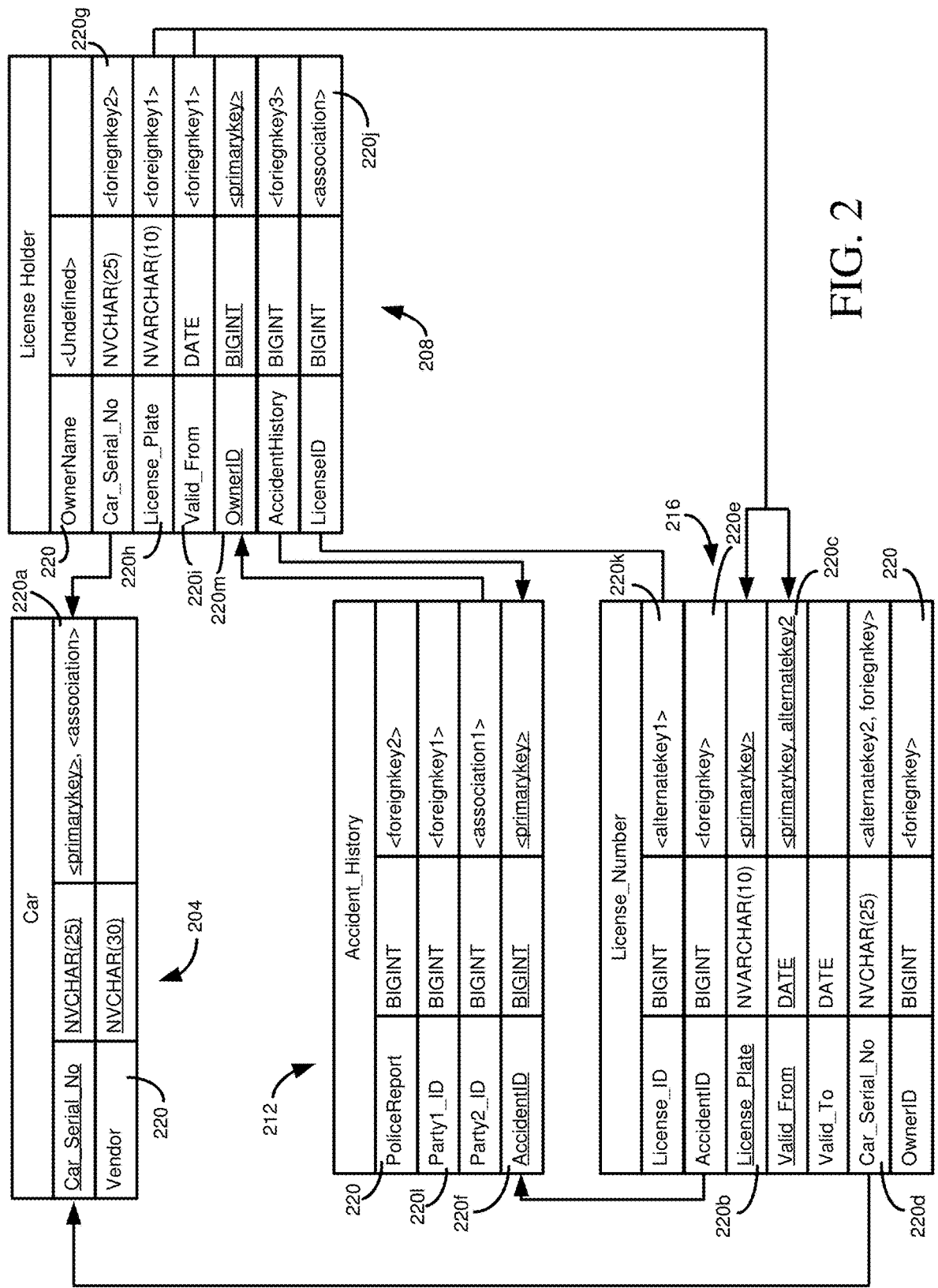

CLUSTERING WITHIN DATABASE DATA MODELS

FIELD

The present disclosure generally relates to data object clustering and schema or data model analysis. Particular implementations relate to clustering within data models, and systems and methods for analyzing schema structures for clustering, such as for database table clustering.

BACKGROUND

Enterprise data models and database schemas are often very large and very complex, and may consist of thousands of entities, attributes, and relations among the entities and attributes. Because of this complexity, it is often very difficult to get an overview of "topic areas" within a data model, or otherwise obtain a general or broad understanding of the data model. This problem is made worse when the data model is undocumented or poorly documented, which is often the case. Such a lack of understandable information makes many tasks using the data model difficult, such as writing analytical reports from the data model or matching the model to other data models. The analysis of large enterprise data models and schemas is often done by domain experts or consultants, and is very labor-intensive and costly. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for arranging database objects in a database model into clusters is provided herein. The method may be implemented by one or more computing devices comprising at least one hardware processor and one or more tangible memories coupled to the at least one hardware processor. A first representation of the database model may be received. The first representation may include a plurality of nodes and edges between the nodes, and at least a portion of the nodes of the plurality of nodes may represent database tables and at least a portion of the edges between nodes of the plurality of nodes may represent foreign key relationships.

Edge betweenness values may be determined for the respective nodes in the plurality of nodes in the first representation. Determining a given edge betweenness value for a given node of the plurality of nodes may include, for all pairs of nodes that do not include the given node, determining a number of shortest paths between the nodes of the pairs of nodes that comprise the given node. Determining a given edge betweenness value for a given node of the plurality of nodes may include, for all pairs of nodes that do not include the given node, determining a number of shortest paths between the nodes of the pairs of nodes. Determining a given edge betweenness value for a given node of the plurality of nodes may include summing the ratio of the number of shortest paths that include the given node to the number of shortest paths for all the pairs of nodes that do not include the given node.

A least one node of the plurality of nodes may be identified as a linking node. The linking node may have the highest edge betweenness value of the plurality of nodes and may connect a first subset of nodes of the plurality of nodes to a second subset of nodes of the plurality of nodes. One or more linking nodes may be removed from the plurality of nodes. The first subset of nodes may form a first cluster and the second subset of nodes may form a second cluster. A plurality of degrees may be calculated for the respective remaining nodes. A given degree may be a count of the number of nodes connected to the given node.

A first hub node for the first cluster may be identified. The first hub node may have the highest degree of the nodes within the first cluster. A second hub node for the second cluster may be identified. The second hub node may have the highest degree of the nodes within the second cluster. A first name for the first cluster may be generated based on the first hub node. A second name for the second cluster may be generated based on the second hub node. A clustered representation of the first representation may be stored. The clustered representation may include the first cluster, the second cluster, the first name, and the second name.

A method for generating clusters in a database model is provided herein. The method may be performed by one or more non-transitory computer-readable storage media storing computer-executable instructions for causing a computing system to perform the method. A first representation of the database model may be received. The first representation may include a plurality of nodes and edges between the nodes.

Edge betweenness values may be determined for the respective nodes in the plurality of nodes in the first representation. Determining a given edge betweenness value for a given node of the plurality of nodes may be based on a number of shortest paths between other nodes which include the given node. At least one node of the plurality of nodes may be identified as a linking node based on the edge betweenness values of the plurality of nodes. The linking node may connect a first subset of nodes of the plurality of nodes to a second subset of nodes of the plurality of nodes. One or more linking nodes may be removed from the plurality of nodes. The first subset of nodes may form a first cluster and the second subset of nodes forms a second cluster.

A plurality of degrees for the respective remaining nodes may be calculated. A given degree may be based on the number of nodes connected to the given node. A first hub node may be identified for the first cluster. The first hub node may have the highest degree of the nodes within the first cluster. A second hub node may be identified for the second cluster. The second hub node may have the highest degree of the nodes within the second cluster. A first description may be generated for the first cluster based on the first hub node. A second description may be generated for the second cluster based on the second hub node. A clustered representation of the first representation may be stored. The clustered represent may include the first cluster, the second cluster, the first description, and the second description.

A method for data model clustering is provided herein. The method may be performed by a system, the system having one or more memories, one or more processing units coupled to the one or more memories, and one or more computer-readable storage media storing instructions that, when loaded into the one or more memories, cause the one or more processing units to perform data object clustering operations.

A first graph of a data model may be received. The first graph may include a plurality of nodes and edges between the nodes. Edge betweenness values may be determined for the respective nodes in the plurality of nodes in the first graph. A given edge betweenness value for a given node may be based on a number of shortest paths between other nodes which include the given node.

A linking node of the plurality of nodes may be identified based on the edge betweenness values of the plurality of nodes. The linking node may be removed from the plurality of nodes to form a first cluster of nodes and a second cluster of nodes.

A plurality of degrees may be calculated for the respective remaining nodes. A given degree may be based on the number of nodes connected to the given node. Respective hub nodes may be identified for the respective first cluster and second cluster. A given hub node may have the highest degree of the nodes within the respective cluster. Respective descriptions for the respective clusters may be generated based on their respective hub nodes. A clustered graph of the first graph may be stored. The clustered graph may include the first cluster, the second cluster, and their respective descriptions.

The foregoing and other objects, features, and advantages of the invention will become more apparent from the following detailed description, which proceeds with reference to the accompanying figures.

BRIEF DESCRIPTION OF THE DRAWINGS

FIG. 2 is a diagram of a data model illustrating how tables can be related by foreign keys or associations, and how multiple pathways between tables can exist.

DETAILED DESCRIPTION

Figure 1:
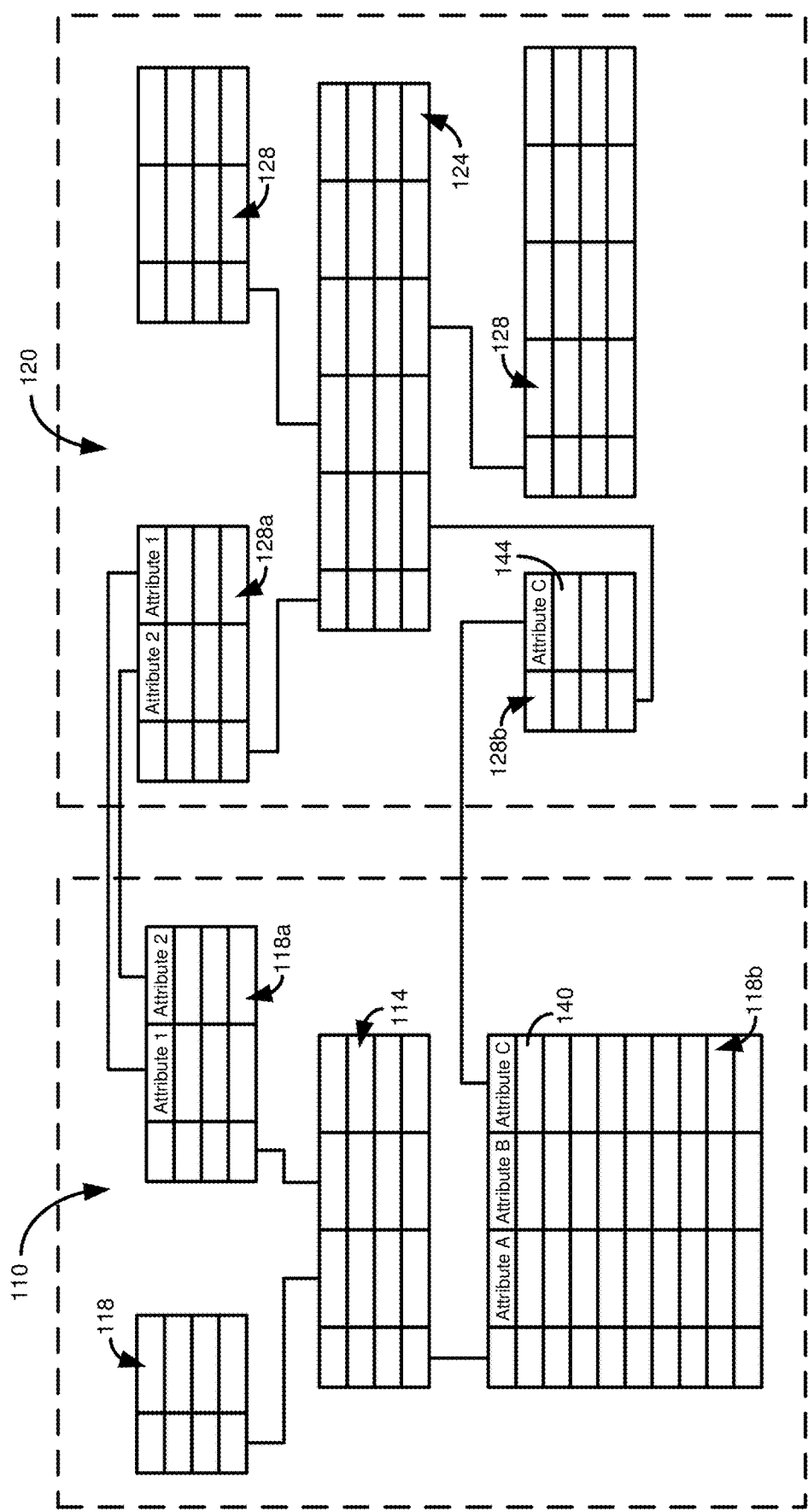
FIG. 1 is a diagram of a data model illustrating how multiple star schemas can be related.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Clustering within a Data Model Overview

There are many scenarios where a thorough understanding of a data model is important to effectively or efficiently accomplish a task. For example, when analyzing a new data model for purchase or upgrade, quickly understanding the data model to determine if it meets basic requirements is important. As another example, ETL (extract, transform, load) processes often migrate or move data from one database to another database, such as a part of system updates, database synchronizing, or data provisioning, which generally requires a good understanding of the data models involved. Another example is when configuring an environment to house a database system, which generally requires an understanding of which components in a data model are closely related to which other components. In yet another example, a collaboration between different people or businesses may lead to a shared database system, which may require consolidation of data from their respective database systems, or database system integration where the separate database systems from the different people or businesses communicate with each other, which can require a thorough understanding of the data models. In all such examples, a thorough and conceptual understanding of the databases can facilitate efficient and effective use of databases. Generally, clustering a data model of a database system may be accomplished by analyzing the data models or database schemas of the database system.

As a more detailed example, an entity may consider acquiring a standard data model rather than update or continue using their current database, including as part of transitioning to a new or updated database software. However, the data model may be complex, and may require multiple consultants and experts to spend significant amounts of time performing the labor-intensive task of analyzing the new data model to determine if it meets the entity's requirements and needs. For example, database schema for ERP systems often include thousands of tables, where each table can include many different fields. The tables and fields can be interrelated, and the schema can be even more complex to analyze given that the tables and fields often do not have names that are easily understood by humans. Clustering the data model using meaningful cluster names generally makes understanding the data model much easier and faster, while being less costly and less labor-intensive, because clustering may hide complexity or details that are unnecessary to generally understand the data model, or determine if the data model meets the requirements sought.

As another detailed example, an entity may begin the technical configuration process for a database after acquiring or implementing a new data model. An efficient technical configuration, such as distribution of tables across multiple servers, may significantly improve the performance of the database. However, the data model may be highly complex, and so identifying associated tables or other data objects to distribute together to the same server may require multiple consultants and experts to spend significant amounts of time performing the labor-intensive task of analyzing the new data model to determine what tables are associated and so often queried together. For example, distributing two tables that are typically joined in a query onto the same server may significantly improve the performance of the query, but identifying tables that are commonly joined may be very difficult from the data model. Clustering the data model using meaningful cluster names generally makes identifying commonly jointly-accessed tables much easier and faster, while being less costly and less labor-intensive. A clustered data model may thus provide easily understandable insight into improving technical configurations for a data model, which are generally not readily available from reviewing the full complex data model.

As yet another detailed example, an entity may acquire a new data model and may need to integrate the new data model with one or more existing data models it currently uses, such as by populating the new database with data from an existing database, or by generating new views based on the new database along with existing databases. This typically requires mapping the existing databases to the new database. However, as described above, the databases may be complex, and may require multiple consultants and experts to spend significant amounts of time performing the labor-intensive task of mapping the current data model to the new data model. Clustering the data model generally makes mapping or aligning one data model to another much easier and faster, while being less costly and less labor-intensive, because clustering may hide complexity or details that are unnecessary to efficiently map one data model to another. This can, in turn, make developing ETL (extract, transform, load) processes between the databases, or collaborative view building including the new database, faster and more efficient. Such mapping may be accomplished automatically or semi-automatically by executing the schema alignment technologies disclosed in SCHEMA ALIGNMENT AND STRUCTURAL DATA MAPPING OF DATABASE OBJECTS patent application filed concurrently herewith, having inventors Sandra Bracholdt, Volker Saggau, and Jan Portisch, and incorporated herein by reference, using a clustered data model representation as described herein.

The disclosed technologies herein provide data object clustering in data models through divisive clustering, which may achieve the data model goals described in the provided examples. For example, ETL processes may be effected from one database to another through data mapping achieved based on the clustered data models. Database views, new database systems, or APIs may be developed for use between different database systems based on data mappings achieved through the clustered data models. A clustered data model may make understanding and interpreting or analyzing the data model faster and easier. Divisive clustering of data objects in a data model may provide a clustered data model representation, or may provide a set of meaningful candidates or options for clustering the data model. Such candidates may be provided to a user to assist in the clustering process, or may be processed by a heuristic or trained machine-learning algorithm to make a clustering determination.

A data model may be an abstract model which may organize elements of data and standardize how they relate to one another and to properties of real world entities. A data model may be a conceptual data model, broadly defining elements, or a physical data model, specifically defining an implementation structure (e.g., definitions of specific database objects, such as database tables or views, in a specific programming language or database implementation, including definitions of relationships between such specific objects). A data model may be a schema, such as a database schema. A data model or schema may be represented as a graph, as described herein.

Clustering data objects within a data model may include analyzing a data model based on its structure to determine clusters. This structural analysis may include applying a divisive clustering algorithm, which may be based on the edge betweenness of data objects in the data model. Edge betweenness for a given data object may be a measure or count of the "betweenness" of the given object, which may be a measure or count of the number of shortest paths, between other objects, which include the given data object. The divisive clustering algorithm may also use the degree of a data object. The degree of a given data object may be a measure or count of the number of edges or connections that an object has. Thus, degree may be a measure of how central the given data object is compared to the other objects to which it is connected. The data object clustering process may be a semi-supervised process, and may identify (automatically or semi-automatically) hub objects, linking objects, or satellite objects (or combinations thereof). Data object clustering may further include analysis of identified clusters to determine meaningful information about the clusters, such as descriptive or naming information.

Clustering data objects in a data model may be accomplished by analyzing a representation of the data model, such as a graph representation or other file format representation (e.g. UML-based files, etc.). The clustering process may result in a clustered data model representation of the same type as the analyzed representation, or the process may create a clustered representation in another format. Data model representations may include the metastructure schema technologies disclosed in MATCHING METASTRUCTURE FOR DATA MODELING patent application filed concurrently herewith, having inventors Sandra Bracholdt, Joachim Gross, Volker Saggau, and Jan Portisch, and incorporated herein by reference, which may be used as data model representations for analysis (e.g. converted to for use in clustering as described herein), for storage or maintenance of clustered representations as described herein, or both.

Data object clustering in data models functionality may be provided in data modelling software, database analytics software, database management software, ERP software, or other data model- or database-driven software systems. Examples of such tools are: SAP FSDP™ SAP FSDM™, SAP Data Warehouse as a Service (DWaaS)™, SAP PowerDesigner™, SAP Enterprise Architect™, SAP HANA™, S/4HANA™, C/4 HANA™, HANA Native Data Warehouse™, all by SAP SE of Walldorf, Germany.

The present disclosure begins with a description of database schema, how objects in a schema can be related, and how multiple paths can exist between a pair of schema objects (which can, for example, affect how efficiently processes that use the schema can be carried out), in Examples 2-5. Examples 6-13 describe disclosed technologies that facilitate data object clustering within data models.

Example 2—Example Relationships Between Star Schemas

FIG. 1 schematically depicts two star schemas 110, 120. Star schema 110 includes a central fact table 114 and three dimension tables 118. Star schema 120 includes a central fact table 124 and four dimension tables 128. The star schemas 110, 120 may be examples of schemas (e.g. data model representations) as described herein for data model clustering. In some embodiments, the two star schemas 110, 120 may be treated as a single schema for clustering.

In order to obtain data from multiple star schemas, a dimension table that is common to both fact tables is used to bridge the two schemas. In some cases, such bridging can occur if one dimension table is a subset of the other dimension table (e.g., one table contains all the attributes of the other, plus one or more additional attributes). In further cases, bridging can occur as long as at least one attribute is shared, or conformed, between the two star schemas.

For example, in FIG. 1, dimension table 118a is identical to dimension table 128a (other than, potentially, a record ID or other means of identifying tuples that does not convey substantive information). Or, rather than having duplicate tables, dimension table 118a and dimension table 128a can be the same table, but represented as members of multiple star schemas. Each attribute in the dimension tables 118a, 128a can serve as a pathway between facts in fact table 114 and facts in fact table 124. However, each of these pathways is different, in that different attributes are linked together. It can be important which attributes are used to link dimension tables 118a and 128a. For example, operations (e.g., specified by a SQL statement) to implement the pathways may be different. Additionally, some of the pathways may use indexed attributes, while others do not, which can affect the execution speed of a particular pathway.

In the example scenario of FIG. 1, an alternate way of obtaining facts from fact tables 114 and 124 is through the use of attribute 140 of dimension table 118b and attribute 144 of dimension table 128b. However, as shown in FIG. 1, table 118b includes a larger number of tuples than table 118a, which can result in a path involving table 118b having a longer execution time, and requiring more computing resources, than a path involving table 118a.

Example 3—Example Table Relationships Using Primary and Alternate Keys

FIG. 2 schematically depicts how tables can be connected via multiple pathways, and how pathways can be connected through different table attributes. FIG. 2 illustrates a table 204 representing a car, a table 208 representing a license holder (e.g., a driver having a driver's license), a table 212 providing an accident history, and a table 216 representing a license number (e.g., associated with a license plate). The tables 204, 208, 212, 216 may be examples of elements or structural components (e.g. data objects) for a schema or data model, as described herein for data model clustering.

Each of the tables 204, 208, 212, 216 has a plurality of attributes 220 (although, a table may only have one attribute in some circumstances). For a particular table 204, 208, 212, 216, one or more of the attributes 220 can serve as a primary key—uniquely identifying particular records in the tuple and being designated as the main method of accessing tuples in the table. For example, in the table 204, the Car_Serial_No attribute 220a serves as the primary key. In the table 216, the combination of attributes 220b and 220c together serve as the primary key.

A table can reference records associated with the primary key of another table through the use of a foreign key. For example, the license number table 216 has an attribute 220d for a Car_Serial_No in table 216 that is a foreign key and is associated with the corresponding attribute 220a of table 204. The use of a foreign key can serve various purposes. The foreign key can link particular tuples in different tables. For example, a foreign key value of 8888 for the attribute 220d would be associated with a particular tuple in table 204 having that value for attribute 220a. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, that can serve to uniquely identify tuples, but which are not primary keys. Table 216, for instance, has an alternate key that is formed from attribute 220c and attribute 220d. Thus, a unique tuple can be accessed in the table 216 using either the primary key (e.g., being a foreign key in another table) or through an association to the alternate key.

In the scenario of FIG. 2, it can be seen that multiple pathways exist between tables. For example, consider an operation that is to collect data from table 216 and table 208. One pathway is to move from table 216 to table 212 using the foreign key 220e. Then, table 208 can be reached through the foreign key relationship of attribute 220l of table 212 to the primary key 220m of table 208. Alternatively, table 208 can be reached from table 216 through table 204, since table 216 has an attribute 220d that serves as a foreign/alternate key for the primary key 220a of table 204, and attribute 220 is also an associate to the alternate key of attribute 220g of table 208.

In the above scenario, both paths have the same length, but link to different attributes of table 212. The scenario of FIG. 2 is relatively simple, so it can be seen that as the number of tables in a data model increases, the number of possible paths can increase greatly, making determining any path, much less the most efficient path for a particular scenario, complex. In addition, even between two tables, multiple, different pathways can exist. For example, table 208 can access tuples of table 216 through the foreign key attributes 220h, 220i of table 208, accessing primary key attributes 220b, 220c of table 216, or using the association provided by attribute 220j of table 216 which references attribute 220k, an alternate key of table 216. Although the ultimate path is different, table 208 to table 216, the paths are different in that different attributes 220 are connected.

If the tables 204, 208, 212, 216 were represented in a graph, each table may be a node. Paths between tables 204, 208, 212, 216 can be edges, which can be unidirectional or bidirectional. However, different paths between tables form different edges. Again using the path between tables 208 and table 216 as an example, the path through the foreign key attributes 220*h*, 220*i* is a different edge than the path through the association attribute 220*j*.

Example 4—Example Graph Representation of Database Objects and Graph Traversal

Figure 3A:
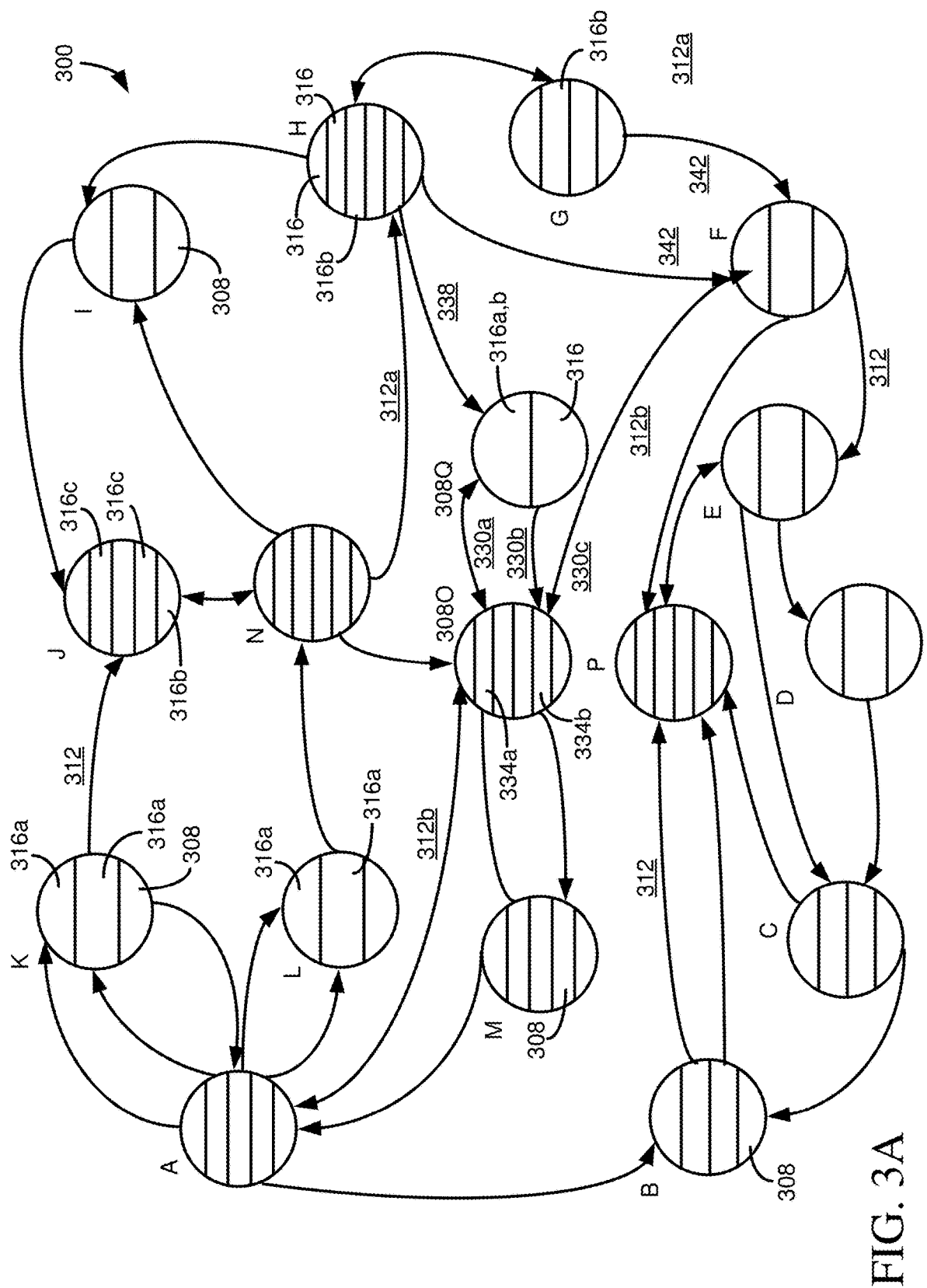
FIG. 3A is a schematic representation of a network of nodes, representing database objects, such as tables, and how multiple pathways can exist between nodes, including through edges connecting to different node attributes.

FIG. 3A illustrates a graph 300 that includes a plurality of nodes 308, where each node 308 is connected to one or more other nodes through one or more edges 312. Edges 312 may be bidirectional or unidirectional. The nodes 308 can represent data sources, such as tables in a relational database. The edges 312 can represent relationships between tables. For example, an edge 312 can represent a primary-foreign key relationship, an association-alternate key relationship, or some other relationship. The graph representation 300 may represent a data model or schema, as described herein, and may be used for data model clustering.

Each of the nodes 308 is segmented into multiple sections 316. Each section 316 can represent a different attribute (or column or field) of a table. Some of the sections 316, such as sections 316*a*, can be unidirectionally connected to one or more attributes of one or more other nodes 308. Other sections, such as sections 316*b*, can be bidirectionally connected to one or more attributes of one or more other nodes 308 (e.g., an attribute can be both a foreign key or association and a primary key or alternate key). Additional sections 316, such as sections 316*c*, are not (at least currently) connections to other nodes 308.

In at least some aspects, unidirectional edges, such as edges 312*a*, can allow a node 308 connected to the tail of an edge to retrieve information from the node connected to the head of the edge. For unidirectional edges 312*a*, the node 308 connected to the head is typically not able to retrieve information from the node at the tail, at least not through that edge.

For example, a node 308 connected to the head may have a primary key that is an attribute 316 that services as a foreign key for a node connected to the tail of the edge 312*a*. The primary key serves to uniquely identify data (e.g., rows, records, or tuples of a relational database table) of the node 308 proximate the head. However, in at least some cases, the primary key of the source node 308 does not uniquely identify data of the target node, the node proximate the tail.

In some cases, the primary key of the source node 308 (which can be a target node that is a starting point for a path) can uniquely identify data of a destination node (which can be a target node that is a destination or ending point for a path), such as when the primary key of the source node is also the primary key or an alternate key of the destination. Additionally, in some aspects, although the foreign key used by a node 308 may not be a primary key, it may be part of a super key (including a candidate key, which can be the primary key), or alternate key, of the node.

The primary key (or other type of key) of a node 308 may include attributes that reference attributes of multiple other nodes. For example, the primary key of a node 308 may include a first attribute from a first referenced node, such as using a foreign key or an association to an alternate key of such node, and a second attribute from a second referenced node, such as a foreign key or an association to an alternate key of such second referenced node.

FIG. 3A illustrates seventeen nodes 308. For large database systems, such as are common for ERP applications, the number of nodes may be orders of magnitude larger. However, even for the comparatively small number of nodes 308 in FIG. 3A, it can be seen that multiple pathways exist between any given node 308. As has been described, even for someone with knowledge of the nodes 308 and their relationships, it can be difficult to determine a route, all routes, or a best route between two nodes, at least if the nodes are not directly connected.

One or more pathways can be identified for obtaining data from at least a first node 308 and at least a second node. Pathways can be identified by representing nodes in a data structure, such as a graph data structure that includes the nodes 308 and connecting edges 312. In some cases, the edges 312 can have one or more weights (e.g., a weight value, a vector of weight value, or a composite or abstract data type that includes one or more values). Weights can represent costs, such as network, memory, or CPU costs that would be incurred, a number of tuples processed, query complexity, or other measures of edge (and therefore path) desirability. In other cases, pathways can be determined without the use of weights.

In particular aspects, a graph traversal method is used to determine one or more paths between two or more specified nodes 308. In some cases, the traversal can determine all paths, while in other cases the traversal method can determine a subset of paths, such as a shortest path (where shortest can refer to a smallest number of nodes traversed or smallest with respect to one or more weights, or a cost function that includes multiple weights). In a particular example, a depth-first search is used to determine paths between two given nodes. In a more particular example, the depth-first search considers a single edge between pairs of nodes in a prospective path, even if multiple edges exist when considered at attribute-level granularity. Once paths are determined, attribute-level edge information can be added to the path information so that such edge information is not lost.

To illustrate how different edges 312 can be used to distinguish paths, in FIG. 3A, a node 308O is connected to a node 308Q by edge 330*a*. Edge 330*a* connects to attribute 334*a* of node 308O. Attribute 334*b* is connected to nodes 308Q and (308) F by edges 330*b* and 330*c*, respectively. If node 308O is a terminating or target node in the path (e.g., the starting or ending node), a path through edge 330*a* would not be considered equivalent to a path through edge 330*b*, because the edges connect to different attributes of node 308O. Among other things, a request to retrieve or modify data, such as a SQL statement, would typically be constructed differently depending on whether attribute 334*a* or attribute 334*b* was being accessed (e.g., SELECT . . . WHERE ATTRIBUTE334A=VALUE versus SELECT . . . WHERE ATTRIBUTE334B=VALUE).

Similarly, if node 308O was not a terminating node, paths through edges 330*a* or 330*b*, 330*c* would not be considered equivalent, at least in a final path determination, or when operations are generated to define a particular path (e.g., one or more SQL statements). First, other portions of the paths would typically be different. For example, traversing edge 330*a* would require a path that includes edge 338. Traversing edge 330*c* would require a path that includes one of edges 342. So, a path through edge 338 may have a different length (e.g., number of nodes) or cost than a path through an edge 342. Second, operations to access data, such as SQL statements, via the paths would be different.

Graph traversal algorithms typically assume that edges 312 between nodes 308 are equivalent. That is, if an edge accesses a first node, that access is equivalent to the access of an edge from any other second node that accesses the first node. Similarly, typical traversal methods assume that two nodes are connected by one edge (which could be unidirectional or bidirectional). In the event these conditions hold true, such typical graph traversal methods can be used, as well as other methods, such as Dijkstra's algorithm or the use of spanning trees (including minimum spanning trees) can be used for path calculations. However, in at least some cases, a traversal method is used that finds more than just the shortest available path, such as all paths, or a subset of all paths that includes more than a single path, including a subset of paths that are noncyclical or which satisfy other constraints (e.g., cost constraints, constraints on which nodes may or may not be in a path). Once paths are determined, attribute-level edge information can be added to the paths.

Pseudocode for a suitable traversal method is:
Start at the first target node (e.g., a starting node for the path);
Get a list of all nodes immediately reachable from the first target node;
Call the depth-first search method recursively for each node of the list;
If the node is the second target node, mark all nodes in the found path as searched (such as using a flag or Boolean value);
If the node has the calculated flag set, save the current path, and return to the previous node in the path;
Otherwise, traverse all nodes connected to the current node;
Remove all nodes that are not part of a saved path; and
Add all possible edges between the nodes.

In some cases, such as using the above pseudocode, a path finding method can determine a set of nodes that are reachable without considering how they are reachable. That is, a first connection to a node through a first edge to a first attribute is considered to be equivalent to a second connection to the node through a second edge to a second attribute. Once the set of reachable nodes has been determined, the edges between the nodes can be added. A visual depiction of the graph can be provided to a user, and the user may visualize how a given path may involve connections to different attributes of a particular table.

Figure 3B:
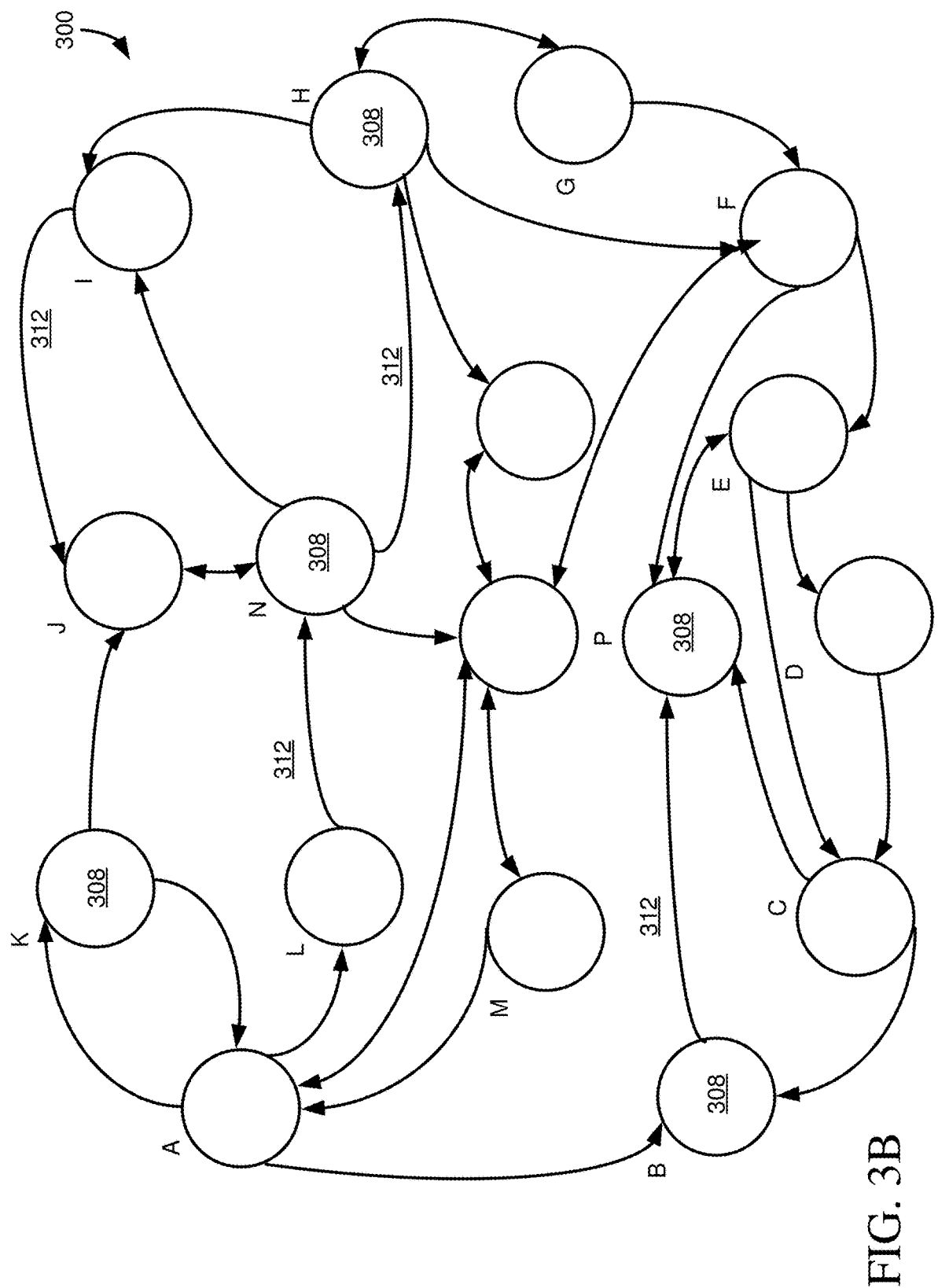
FIG. 3B illustrates the network of nodes of FIG. 3A, where a single edge connects related nodes and differences in connected attributes are not taken into account.

FIG. 3B illustrates the graph of 300 showing edges 312 between nodes 308, where it is not considered to which attribute(s) an edge connects, and multiple edges between nodes are reduced to a single edge. The above pseudocode can be used to determine paths between nodes. When the paths are to be displayed to a user, the individual edges between attributes can be added in to provide information as shown in FIG. 3A. The user can then determine which of the available paths are more suitable for their purposes, including considering which paths involve the fewest number of nodes, which paths may be more efficient, and paths that may include nodes that have information that may be of interest for a particular purpose (e.g., will be retrieved in a query that traverses the path).

In other aspects, a path determination method can distinguish between different edges to a particular node. For example, assume a node A has a first edge to a first attribute of a node B and a second edge to second attribute of node B. A path from node A to node B through the first edge can be considered different than a path from node A to node B through the second edge.

In some cases, a user can supply path constraints. For example, a user can specify nodes that must be on a path or that must not be on a path. Required nodes can be in the form of a white list prior to an initial path determination, or can be provided by a user (and added to a white list) after an initial path termination. Similarly, prohibited nodes can be provided in the form of a black list prior to initial path determination, or can be provided to a user (and added to a black list) after initial path determination. After an initial path has been determined, nodes can be indicated as required or prohibited in response to user input provided using a display of a current graph of nodes and their interconnections.

When a user selects one or more nodes to be required or prohibited, the paths between nodes can be recalculated and an updated graph, typically with fewer paths, and potentially fewer nodes, can be displayed to a user. The user can interactively designate nodes to be required or prohibited to reduce the number of paths displayed. The user can select a final path, which can result in the generation of operations, such as SQL statements, to implement the chosen path.

In typical traversal methods, nodes are not visited multiple times. However, in some aspects, a traversal method can visit a node multiple times. Visiting a node multiple times can be allowed, in some cases, when multiple edges exist to the node. Visiting a node multiple times can be allowed, in further cases, when a node is required to be on a path.

Consider a set of nodes A, B, C, M, and Z. Assume node A is connected to node B, node B is connected to node C, node C is connected to nodes M and Z, and node M is connected to node Z. If multiple visits to a node are not allowed, and node M is a required node, no path exists from node A to node Z, because the only way to node Z is through node C, and node C must be reached to visit node M. However, if multiple visits to a node are allowed, and node M is a required node, a path does exist from node A to node Z, although it involves node C being visited twice—from node B to node C and from node M to node C. In further aspects, a node can be visited multiple times so long as the visits occur through different attributes. For instance, in the above example, multiple visits to node C may be allowed if the edge from B to C connects to a first attribute of node C and the edge from M to C connects to a second attribute of node C.

As mentioned, in some cases, intermediate nodes can be specified as being required for a valid path or being excluded from a valid path. In one example, when a node is specified as being required, candidate paths are evaluated. When a candidate path is determined to connect a first target and a second target node (i.e., the endpoints of the path), it is determined whether the path includes all intermediate nodes that are required for a valid path (e.g., all nodes on a white list). If it does, the path is selected as a possible path and saved. If not, the path is discarded. However, sufficient path information can be saved (e.g., a flag is set) such that the same path is not reevaluated for a particular path determination instance.

In another example, when a particular node is specified as being prohibited for a valid path, calculation of a particular path stops as soon as a node is encountered that is on the list of prohibited nodes, or black list. That is, the path finding method does not iterate over nodes on the black list. In this way, no paths indicated as valid will include a prohibited node. In other aspects, black listed nodes are just removed from the set of available nodes.

Example 5—Example User Interface Screens

FIGS. 4-7 present example user interface screens according to an example embodiment of the disclosed technologies. The example user interface screens can allow a user to visualize paths between nodes, obtain path information (for example, nodes visited, node attributes accessed, and example operations for the path, such as SQL statements to implement the path).

Figure 4:
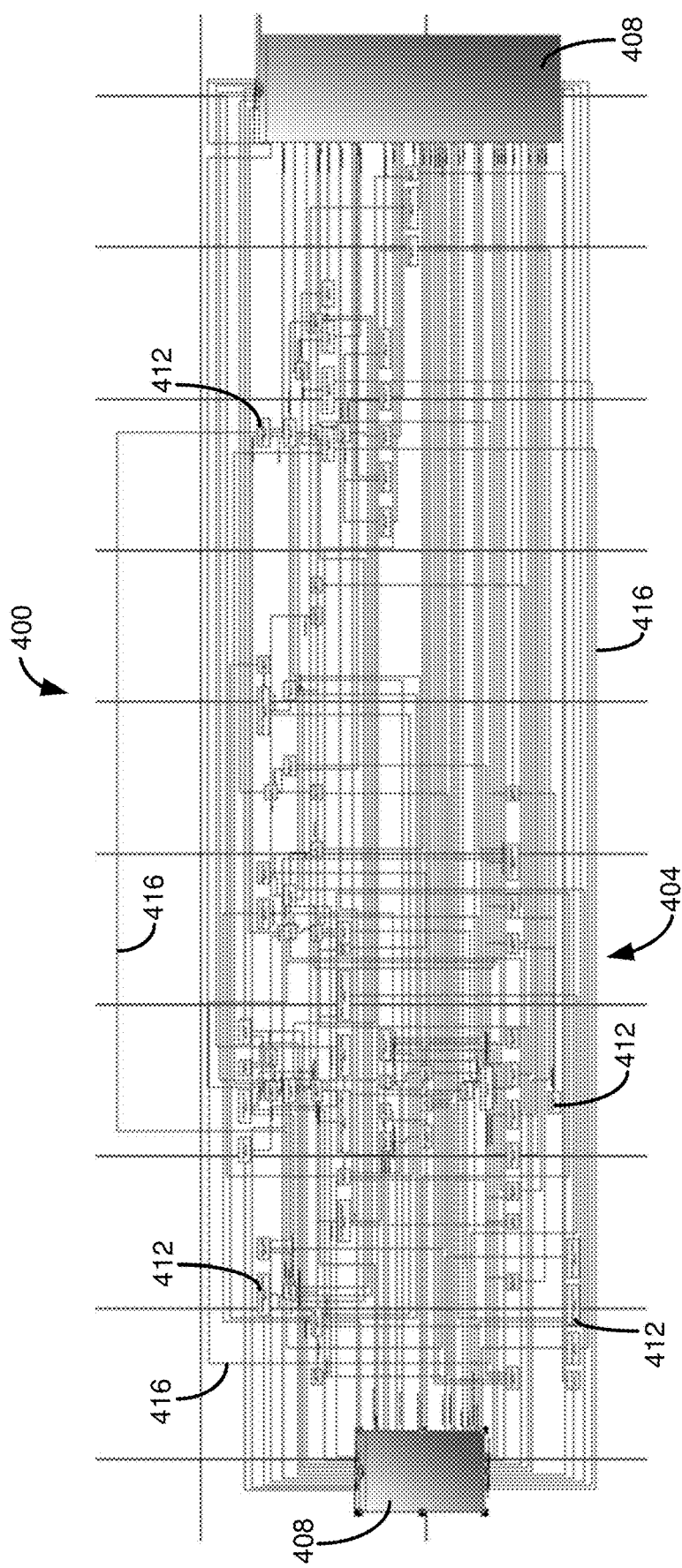
FIG. 4 is an example user interface screen illustrating multiple paths between two target nodes.

FIG. 4 illustrates a user interface screen 400 that illustrates a graph 404 of target tables 408 (e.g., tables having one or more attributes from which data is to be retrieved) and connecting tables 412. Connections 416 link pairs of target tables 408, connecting table 412, or combinations thereof. The graph 404 can include 80 tables from which connections 416 and pathways can be formed.

Each connection 416 typically indicates a unique edge in a path between the target tables 408 (e.g., between particular sets of one or more attributes of the tables connected by the edge). In some aspects, if a user selects a connection 416, the corresponding path or paths associated with the connection is highlighted. For example, the selected path may be enlarged, displayed in a different color, displayed in a different line width or pattern, highlighted, or otherwise visually distinguished from connections 416 of other paths. Selecting a path may also present operations, such as SQL statements, implementing the path. In some cases, a user may copy and paste the operations, or designate that the operations be used in a particular application.

A user may also select tables 412 or connections 416 to be placed on a list of required tables or connections or a list of prohibited tables or connections. For example, a user may perform a pointing action, such as right-clicking, on a node or connection to display a list of options, which can include adding the node or connection to list of required nodes or connections or a list of prohibited nodes or connections. Or, user interface elements can be displayed to allow a user to tag tables 412 or connections 416 as being required or prohibited. In some cases, each time a table 412 or connection 416 is indicated as required or prohibited, paths in the graph 404 can be recalculated and displayed. In other cases, a user may make various annotations to the graph 404, and can be manually indicated (e.g., by selecting a "recalculate" icon) that recalculation should be performed. In still further embodiments, a user can add required or prohibited nodes to a table, and the information in the table can be used to recalculate paths in the graph 400, including when indicated by a user.

Figure 5:
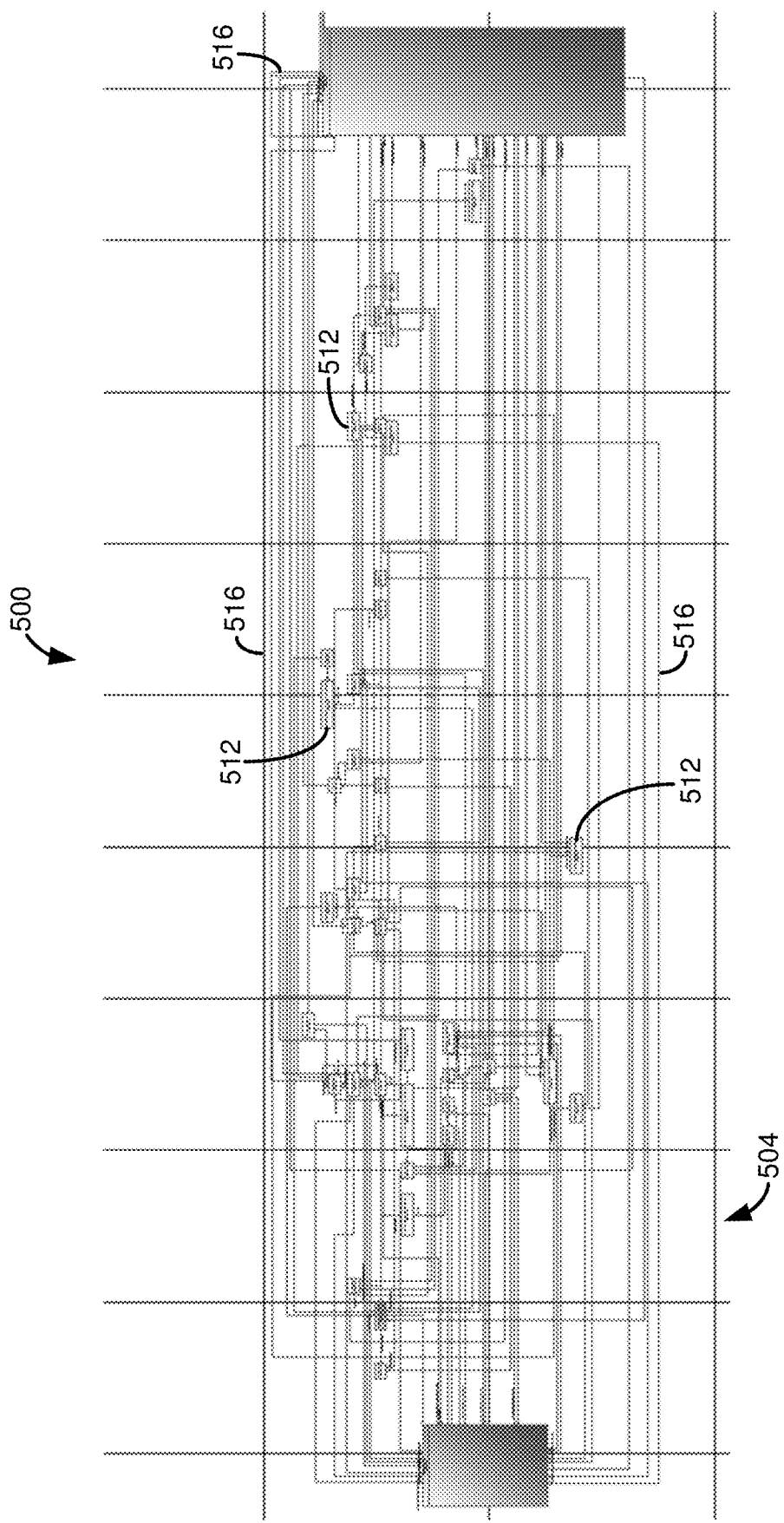
FIG. 5 is an example user interface screen illustrating how paths can be reduced between the target nodes of FIG. 4 by specifying a particular node as required for a path to be valid.

FIG. 5 illustrates a user interface screen 500 having a graph 504 that can be similar to the user interface screen 400 of FIG. 4. However, in FIG. 5, a single table has been added to a list of required tables. It can be seen that the number of connections 516, and consequently pathways, has been greatly reduced compared with FIG. 4. For example, while the graph 404 can have 80 tables, the graph 504 can have 44 tables 512—a reduction of almost half merely by marking a single table as required.

Figure 6:
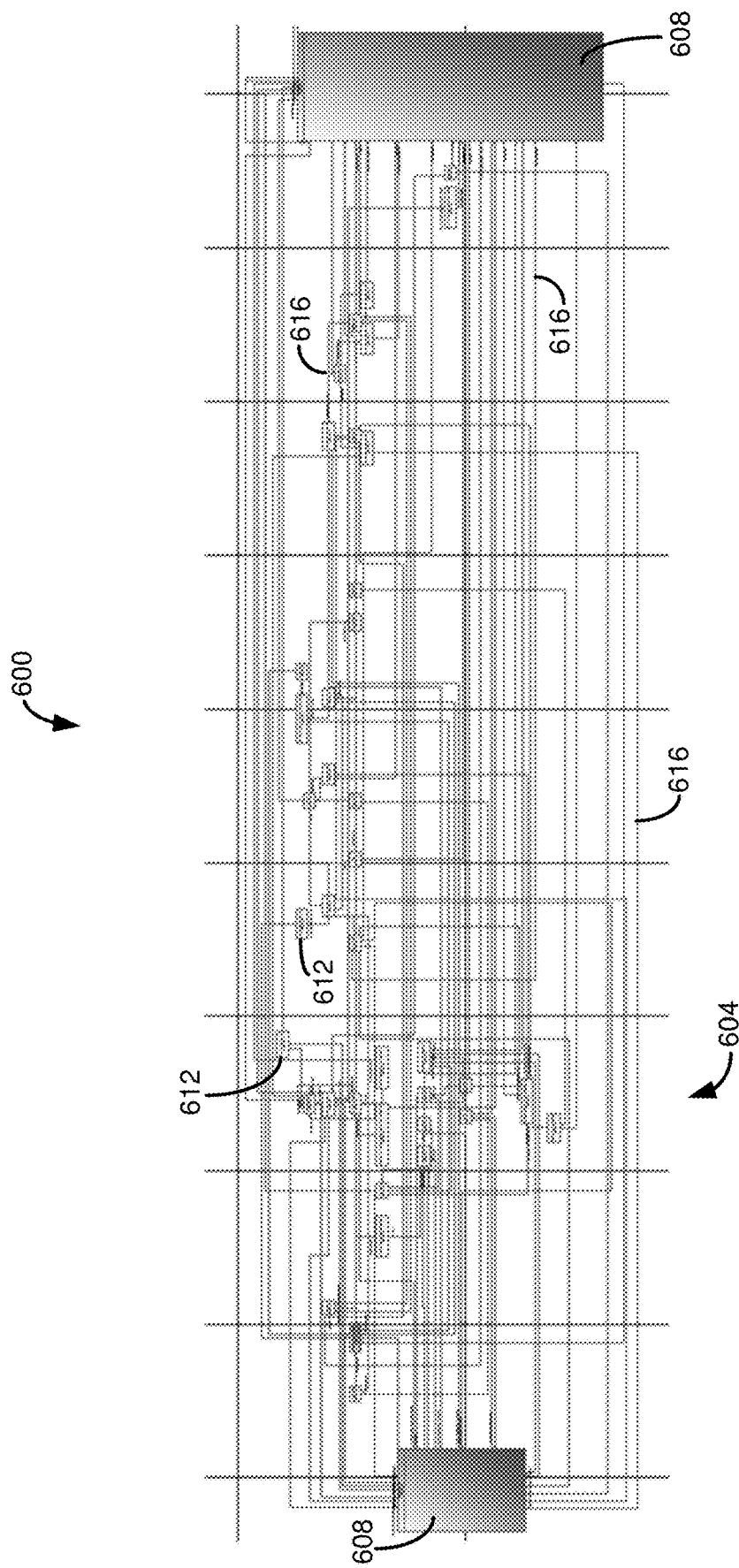
FIG. 6 is an example user interface screen illustrating how paths can be reduced between the target nodes of FIG. 4 by specifying a particular node as prohibited for a path to be valid.

Similarly, FIG. 6 illustrates a user interface screen 600, which can be similar to the user interface screen 400 of FIG. 4, having a graph 604. In the screen 600, a single table was added to a list of prohibited tables. Again, the number of connections 616 and intermediate tables 612, and consequently pathways, between target tables 608 have been greatly reduced compared with FIG. 4. For example, while the graph 404 can have 80 tables, the graph 604 can have 42 tables—a reduction of almost half merely by marking a single table as prohibited.

Figure 7:
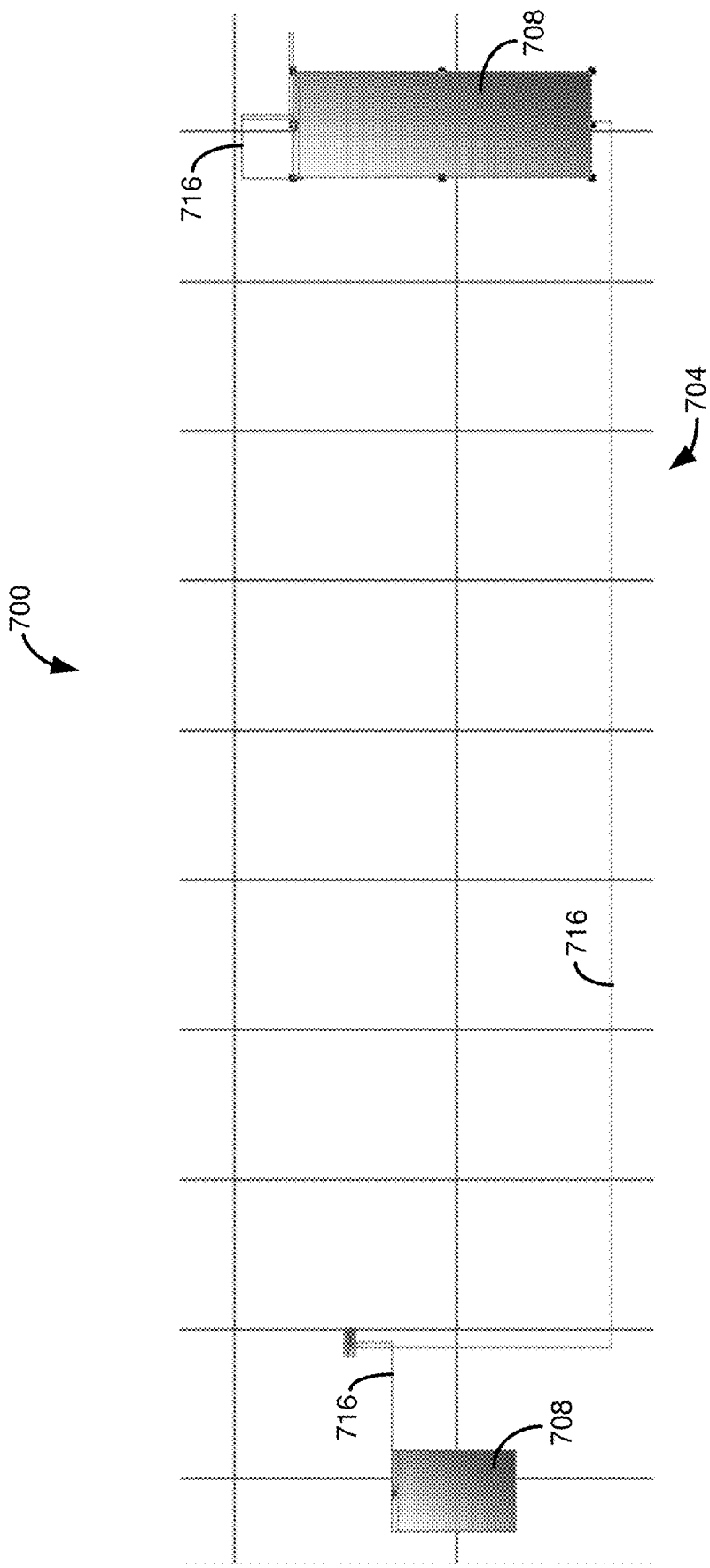
FIG. 7 is an example user interface screen illustrating how a user can eliminate paths from the paths of FIG. 4 in order to obtain a desired path.

FIG. 7 illustrates a user screen 700, which can be similar to the user interface screen 400 of FIG. 4. The screen 700 includes connections 716 for a single, selected path between target tables 708 of a graph 704. As described, an application providing, or associated with, the screen 700 can generate operations, such as SQL statements, to implement the selected pathway.

Example 6—Data Model Clustering Architecture

Figure 8A:
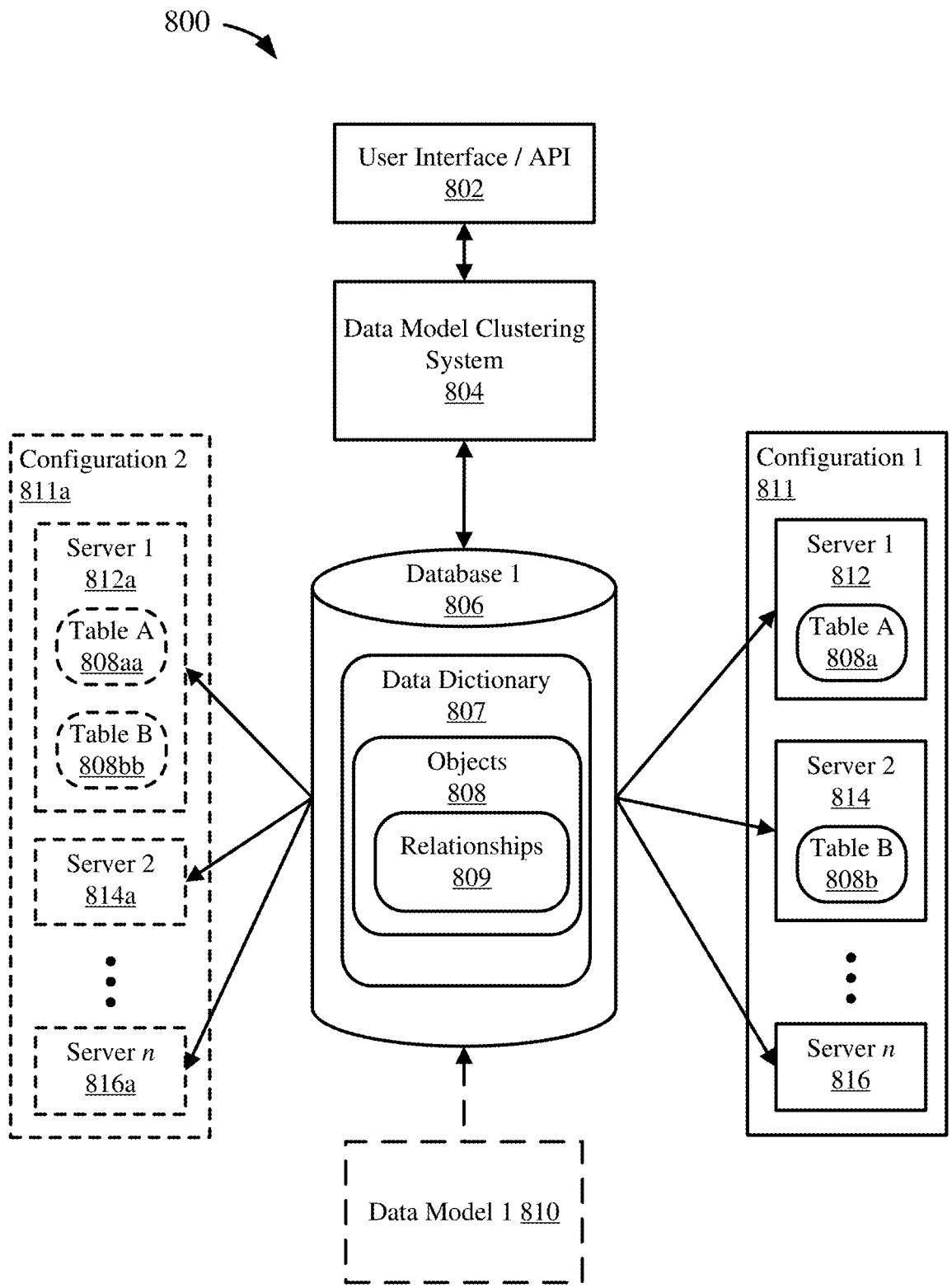
FIG. 8A is an architecture diagram depicting a system for data model clustering.

FIG. 8A is an architecture diagram depicting a system 800 for data model clustering. A first data model 810 may be implemented as database 1 806. Database 1 806 may have a data dictionary 807, one or more data objects 808, and one or more relationships 809 between the data objects.

Database 1 806 may have a data dictionary 807, which can include definitions (e.g., schema) for one or more data objects 808 (e.g., database tables or views), which definitions can define one or more relationships 809 between the data objects, including between schema elements of the data objects (such as relationships between a field of a first table and a field of a second table, such as a foreign key relationship or an association). Although not shown, the database 1 806 can include additional features, including instances of the object schemas included in the data dictionary 807, such as tables having the schema, where the tables can store data for particular records. While the data dictionary 807 is shown at the database 1 806, a data dictionary 807 can be stored at other locations, such as at a middleware layer that communicates with the database 1. Or, information corresponding to the data model 1 810 can be stored other than in a data dictionary, but used in the disclosed technologies, so long as it corresponds to the data model.

The data dictionary 807 may have a schema defining database 1 806, which may include definitions for the objects 808 and relationships 809. Generally, the schema in the data dictionary 807 is an implementation of the data model 1 810. The data dictionary 807 may also have one or more other representations of database 1 806, such as one or more graph representations of database 1 806, as described herein. In other embodiments, a graph representation of database 1 806 may be stored in database 1 806 but not in the data dictionary 807, or in another system which may be in association with database 1 806.

The data objects 808 may be structural components of database 1 806, such as tables (as described herein), views, or stored procedures. The data objects 808 may be linked to each other by the relationships 809. For example, a first table may be linked to a second table by a relationship. The relationship may be implemented as a foreign key field (e.g. column) in the first table defined as pointing to or linking to the second table (e.g. a given row in the second table based on the value in the foreign key field), or as an association (e.g., a non-foreign key relationship between database objects, or individual fields or elements thereof). In a graph representation of database 1 806, as described herein, such tables may be nodes and the relationships may be links or edges between the nodes. As used in the present disclosure, a graph may refer to a graph data structure that can be used to hold vertices and edges, or another representation of objects (e.g., tables or view) and how the objects are interrelated or connected, but need not be stored as a graph data structure.

A data model clustering system 804 may provide functionality for clustering data objects 808 within data model 1 810 as implemented in database 1 806. The data model clustering system 804 may access the database 1 806 to analyze it as part of the data model clustering, which may include obtaining the schema from the data dictionary 807 or other representation of the data model 1 810, such as a graph representation. In some embodiments, the data model clustering system 804 may access one or more files representing the data model 1 810, in place of accessing the database 1 806. For example, data model 1 810 may be stored as one or more UML diagram files, which may be used by the data model clustering system, or may be converted to a graph representation which may then be used by the data model clustering system 804. The data model clustering system 804 may be a stand-alone system or software program, or may be a data model clustering module as described herein.

The data model clustering system 804 may have a user interface/API 802. The user interface 802 may provide a user with a display of identified clusters of the objects 808 in database 1 806, such as a visualization of the database schema or data model 1 810 and the determined or proposed clusters. The user interface/API 802 may allow a user to select a data object (e.g. out of 808) to identify as a hub object or a link object for use in cluster determination, as described herein. The user interface/API 802 may allow a user to receive or display a set of options for data model clustering. The user interface/API 802 may allow a user to select an option for clustering, change clusters, suggest clusters, or identify hub or link objects for use in clustering, as described herein. The user interface/API 802 may allow another program or process to access the data object clustering functionality of the data model clustering system 804, such as to obtain a set of determined or possible clusters of objects 808 in database 1 806.

Database 1 806 may be stored on a server or be distributed across multiple servers or virtual servers, such as in configuration 1 811 or configuration 2 811a. In configuration 1 811, database 1 806 may be distributed across multiple servers, such as server 1 812, server 2 814, through server n 816. As part of the distribution, some objects 808 may be stored on different servers, such as storing table A 808a on server 1 812 while table B 808b is stored on server 2 814.

In an alternative configuration 2 811a, database 1 806 may be distributed across multiple servers, such as server 1 812a, server 2 814a, through server n 816a. As part of the distribution, some objects 808 may be stored on different servers. In configuration 2 811a, table A 808aa may be stored on server 1 812a while table B 808bb is also stored on server 1 812a.

Such an arrangement as configuration 2 811a may provide performance improvements over configuration 1 811 for database 1 806 when table A 808a, 808aa and table B 808b, 808bb are related and often accessed or queried together. For example, if queries joining table A 808a, 808aa and table B 808b, 808bb are common, then placing table A and table B on the same server 812a as in configuration 2 811a may provide a performance benefit to the query (e.g. return results faster, or require fewer network or other data transfer resources) than configuration 1 811 where the tables are on separate servers 812, 814 and so inter-server communication may cause the join query to process slower. Data model clustering functionality as described herein may provide insight into which data objects (e.g. tables) 808 are related and so are likely to often be queried or otherwise accessed together. Thus, data objects 808 determined to be in the same cluster as by the data model clustering system 804 may be placed on the same server in a distributed database system, thereby providing a performance improvement to the database (e.g. 806).

Example 7—Data Object Classifications and Clusters

Figure 8B:
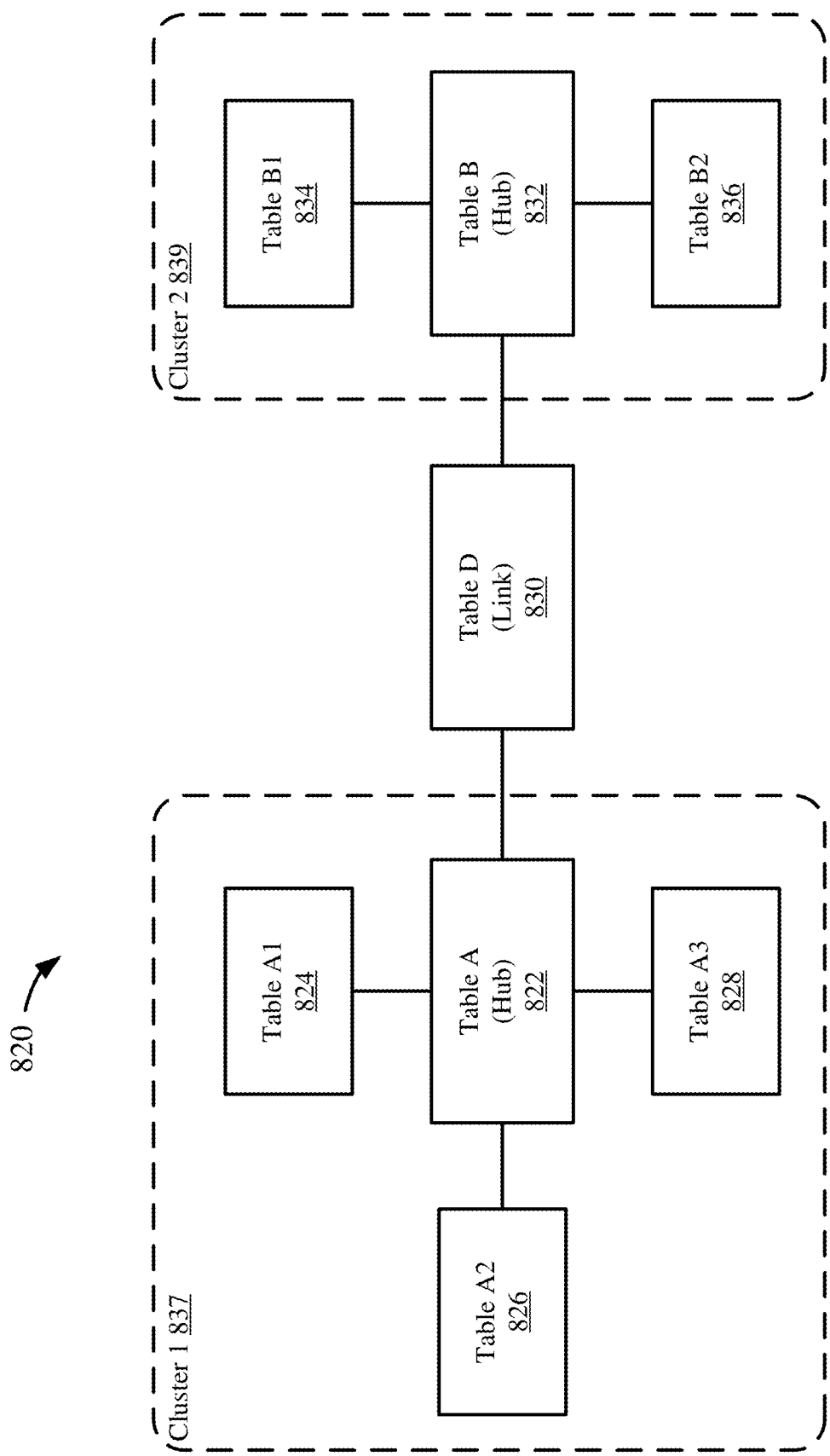
FIG. 8B is a diagram depicting an object clustering example in a database data model.

FIG. 8B is a diagram depicting an object clustering example in a database data model 820. The example data model 820 may be a database schema having table A 822, table A1 824, table A2 826, table A3 828, table D 830, table B 832, table B1 834, and table B2 836. The tables 822, 824, 826, 828, 830, 832, 834, 836 may arranged (e.g. connected, such as through foreign keys) as depicted. The tables 822, 824, 826, 828, 830, 832, 834, 836 may be represented as nodes in a representation of the data model 820, such as a graph representation.

Data objects (e.g. nodes) in a data model may be classified as hub objects, link objects, or satellite objects. Data objects may be classified based on their degree or their edge betweenness, or a combination of both. An object's degree is generally a measure of the number of connections (e.g. links or edges) an object has (e.g. how many other objects are connected to it). An object's edge betweenness is generally a measure of the number of shortest paths between other objects the object is within (e.g. how many shortest paths the object is on, or how "between" it is). Generally, the degree value is most effective at identifying hub objects, while the edge betweenness value is most effective at identifying link objects.

Tables A and B 822, 832 may be hub tables (e.g. hub objects). Generally, hub objects have the highest degrees compared to other objects in the data model. For edge betweenness, hub objects generally have a higher edge betweenness than satellite objects, but a lower edge betweenness than link objects. Generally, hub objects are effective for identifying the nature or substance of a cluster. As an example, a hub object may be a fact table in a database.

Table D 830 may be a link table (e.g. link object). Generally, link objects have a degree between hub objects and satellite objects in the data model. For edge betweenness, link objects generally have the highest edge betweenness compared to other data objects in the data model. Generally, link objects are effective for identifying the boundaries of potential clusters. As an example, a link object may be a fact table integrating data from other fact tables in a database.

Tables A1, A2, A3, B1, and B2 824, 826, 828, 834, 836 may be satellite tables (e.g. satellite objects). Generally, satellite objects have the lowest degrees compared to other objects in the data model. For edge betweenness, satellite objects generally have the lowest edge betweenness values compared to other objects in the data model as well. In some cases, objects in a data model not classified as either hub or link objects may be classified as satellite objects by default. As an example, a satellite object may be a dimension table in a database.

A data model 820 may have one or more clusters 837, 839. Generally, such clusters 837, 839 are not defined or otherwise stored in the data model, but are a result of the structure of the data model, and so determination or identification of the clusters is generally needed to make use of the clusters, as described herein. A cluster 837, 839 may be the set of connected or related data objects separated from other data objects in the data model by one or more link objects.

Cluster 1 837 may be the set of table A 822, which is a hub table, and tables A1, A2, and A3 824, 826, 828, which are satellite tables. Table A 822 may be used to identify, define, enrich, or otherwise name cluster 1 837, as it is the hub table within the cluster.

Similarly, cluster 2 839 may be the set of table B 832, which is a hub table, and tables B1 and B2 834, 836 which are satellite tables. Table B 832 may be used to identify, define, enrich, or otherwise name cluster 2 839, as it is the hub table within the cluster.

Table D 830 is a link table, and so is not a part of either cluster 1 837 or cluster 2 839. Generally, link objects are not part of clusters. In some cases, link objects may be removed from a representation of the data model when clustered. In other cases, a link object may be used to identify a cluster having just the link object. In such cases, the link object would also act as the hub object for the cluster.

Example 8—Data Model Clustering Processes

Figure 9A:
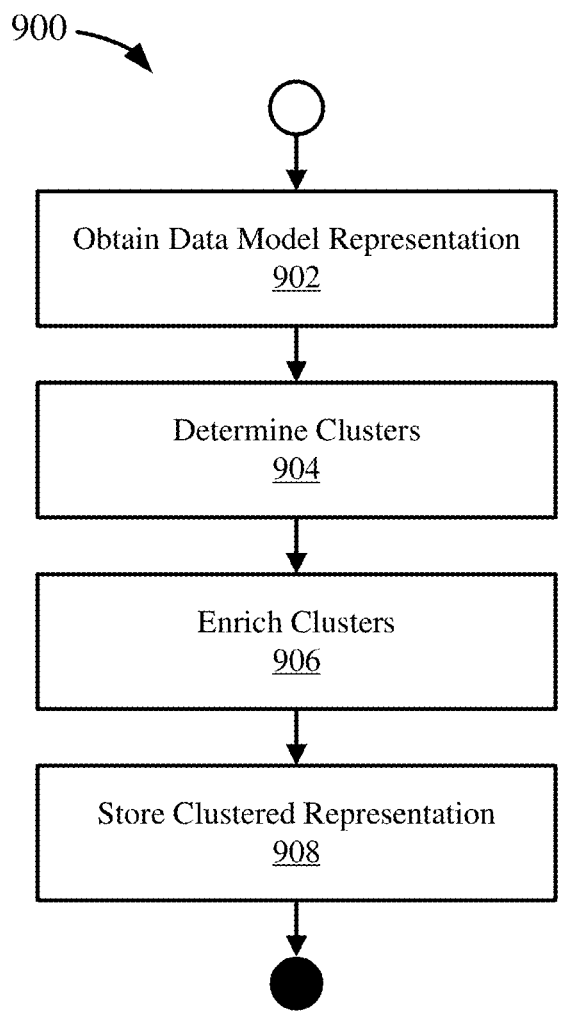
FIG. 9A is a flowchart illustrating a process for data object clustering.

FIG. 9A is a flowchart illustrating a process for data object clustering. The process 900 generally identifies one or more clusters of related data objects in a data model. The process 900 may be automatic, resulting in a clustered data model representation, semi-automatic where the process accesses or communicates with one or more other algorithms or software services (e.g. heuristic or machine-learning algorithms for identifying clusters, classifying nodes, or calculating particular values), or may be user-engaged, such as presenting options to a user for clusters or data object classifications for use in clustering.

A data model representation may be obtained or received at 902. Receiving the data model representation at 902 may include receiving an identifier for the data model representation, which may be used to access the data model representation (e.g., in a data dictionary). A location value may be provided along with the data model identifier, in some cases. In other embodiments, receiving the data model representation at 902 may include receiving an indicator to access a database to obtain the data model representation. In other embodiments, the data model representation itself may be received at 902. For example, a graph representation of the data model may be received (or otherwise obtained) at 902.

In some embodiments, obtaining a data model representation at 902 may include transforming a schema or data model into a graph representation. Transforming the schema or data model at 902 may include receiving or otherwise accessing the schema or data model as described for step 902, and generating a graph representation of the schema or data model, as described herein.

Clusters in the received data model may be determined at 904. Generally, determining the clusters includes identifying sets of data objects connected together in the data model that are more connected to each other than other data objects, or sets of data objects, in the data model. Determining the clusters at 904 may include traversing the data model representation to identify clusters. Determining the clusters at 904 may include analyzing the data model representation using a clustering algorithm, such as a divisive clustering algorithm, and may further include calculating degree values or edge betweenness values (or both) for objects in the data model representation. In some embodiments, determining the clusters at 904 may include altering the data model representation, or a copy of the data model representation (or a temporary copy), such that the data model representation contains the clusters (e.g. deleting non-clustered nodes, such as link nodes, such that the nodes that remain are in clusters) or information delineating the clusters (e.g. fields in nodes, or in node metadata, that indicate a type of classification for the node, or which cluster the node is in).

The determined clusters may be enriched at 906. Generally, enriching a cluster may include annotating the cluster to provide meaningful or usable information about the cluster. For example, the cluster may be named (e.g. a string value may be stored in a name field), or other information about the cluster may be added, such as number of data objects, number of satellite objects, and so on. Enriching the clusters at 906 may include analyzing the clusters, and may further include calculating degree values or edge betweenness values (or both) for objects in the clusters of the data model representation. Analyzing the data objects in a cluster to enrich the cluster may also include a semantic or heuristic analysis of the data objects in the clusters.

The enriched data model clusters may be stored at 908. Storing may include writing the data model clusters (or the clustered data model) to a memory or other data storage, such as in a database or data model representation file. The stored clustered data model may include identifiers for the unclustered data model or data model representation (e.g. the data model representation received at 902). In some embodiments, the clustered data model may be stored in a data model representation, such as by setting a field(s) in the clustered data objects to identify the respective clusters for those data objects, or deleting non-clustered data objects and connections to such objects (e.g. link objects), which thereby creates clusters (connected or unconnected) is a data model representation such as a graph representation.

In other embodiments, the clustering information may be stored as a metadata object or objects in a metadata schema for the data model, or as an instance of an abstract data type (e.g., a class) that represents a data model. A pseudocode example of such an object is:

```
class Cluster{
    identifier;
    name = hub.name; //hub is an object from the array objects
    description;
    array clusterEdges = cluster(n).identifier; //connection to other clusters
    array objects = object(n).identifier; //objects within cluster
}
```

Figure 9B:
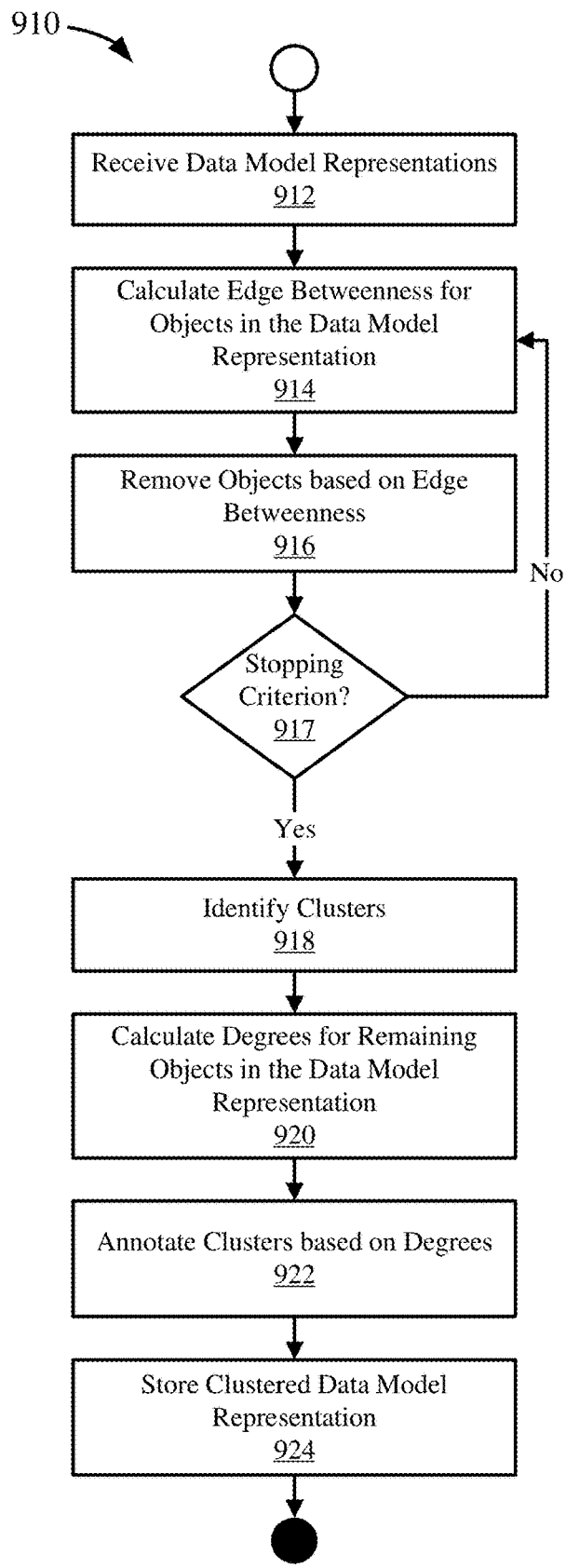
FIG. 9B is a flowchart illustrating a process for automatic data object clustering.

FIG. 9B is a flowchart illustrating a process 910 for automatic data object clustering. A data model representation may be received at 912, similar to step 902 in the process 900 shown in FIG. 9A.

Edge betweenness values may be calculated for objects in the data model representation at 914. Generally, edge betweenness values are calculated for all objects in the data model representation. In some cases, edge betweenness values may be calculated for a subset of all objects in the data model representation, such as only for objects that have not been removed (e.g. had a removal flag or indicator set, or previously been identified as link objects).

Edge betweenness of an object is generally calculated from the number of shortest paths that pass through the object, which may include a summation of the total number of shortest paths that pass through the object. For an object, edge betweenness may be a measure or count of the number of shortest paths, between other objects, which include the object. Calculating edge betweenness may be described as follows:

$$NB_{(v)} = \sum_{i,j \neq v, i \neq j} \frac{|\sigma_{ij}(v)|}{|\sigma_{ij}|}, \quad \text{(equation 1)}$$

where v is the object for which the edge betweenness is being calculated, and i and j are other objects. The number of shortest paths between objects i and j that go through object v may be described as:

$$|\sigma_{ij}(v)| \quad \text{(equation 2)}.$$

Further, the number of shortest paths between objects i and j may be described as:

$$|\sigma_{ij}| \quad \text{(equation 3)}.$$

Edge betweenness may be normalized, such as to normalize the calculated edge betweenness values to be between zero and one ($NB' \in [0, 1]$). Generally, normalizing the edge betweenness values may make them more understandable and increase their compatibility or comparability between different data models. Normalization of edge betweenness, in undirected graphs, may be described as follows:

$$NB'(v) = \frac{NB(v)}{(|V|-1)*(|V|-2)}, \quad \text{(equation 4)}$$

where $|V|$ is the number of objects in the data model (e.g. nodes in the graph representation).

Data objects may be removed from the data model representation based on their edge betweenness at 916. Because the data model representation used throughout this process 910 is generally a temporary or local copy of the data model representation (and not a representation used in a production database, for example), the data objects may be removed without impacting functionality of other systems using or relying on the data model. Removing the data objects may include identifying link objects based on their edge betweenness, and then removing the link objects. Data objects sharing the highest edge betweenness value, compared to the other data objects, may be removed (or identified as link objects). Alternatively or additionally, data objects with an edge betweenness meeting a given threshold may be removed (or identified as link objects). Alternatively or additionally, analysis performed by a heuristic or machine-learning algorithm may be used to determine which data objects to remove (or identify as link objects).

Removing data objects at 916 may include deleting the data object from the data model representation, which may include deleting all edges leading to the removed data object. In other embodiments, removing data objects at 916 may include setting a flag in the data object to indicate removal, or setting a classification identifier that the data object is a link data object and has been removed. In other embodiments, removing data objects may include generating a new temporary data model representation and removing the data object from the new temporary representation.

The process 910 determines at 917 if the stopping criteria has been reached to stop dividing the data model representation into clusters at steps 914 and 916. If the stopping criteria has not been reached ("no" at 917), then the division of the data model representation into clusters continues by calculating new edge betweenness values at 914 based on the data model representation after previously removing linking objects. If the stopping criteria has been reached ("yes" at 917), then the process continues.

Generally, the stopping criteria at 917 is a measure of the completeness of the clustering of the data model representation. Stopping criteria may include a threshold value for calculated edge betweenness values. For example, if no object has an edge betweenness value that meets or exceeds the threshold value, then the stopping criteria at 917 has been met (e.g. "yes"). Alternatively or additionally, the stopping criteria at 917 may include a predetermined number of iterations (or a predetermined runtime, or a change in the cluster between iterations not satisfying a threshold) to calculate the divisive clustering algorithm (e.g. steps 914 and 916) before stopping. Such stopping criteria may be determined based on a heuristic, statistical, or machine-learning analysis of previously executed clustering data and processes. Alternatively or additionally, the stopping criteria may be configured by a user, either before the process 910 or during the process at 917. Other stopping criteria may be used as well, such as matching user-identified hubs or links as described for process 950 shown in FIG. 9D.

One or more clusters may be identified at 918. In some embodiments, cluster identification at 918 may be passively accomplished when linking objects have been removed, such as at step 916. In such cases, the remaining objects may be interconnected in unconnected groups, or clusters, and so be identified by being available in the transformed data model representation.

In other embodiments, cluster identification at 918 may be active. For example, one or more fields in the data objects of the data model representation (e.g. nodes) may be set to indicate the object is in a cluster, or a particular cluster. Alternatively or additionally, one or more additional data objects, such as metadata cluster objects, may be generated that define the available clusters. Such cluster objects may have cluster information (e.g. identifier, name, etc.) and identifiers for the data objects within the cluster, and may further include one or more edges or connections to other cluster objects. In some such embodiments, a graph representation of the clustered data objects may be generated, where each cluster is a node in the cluster graph.

Degree values may be calculated for objects in the data model representation at 920. Generally, degree values are calculated for all remaining objects in the data model representation. The degree of an object is generally calculated from the number of edges or connections that the object has to other objects. For example, the degree may be the count of the number of edges or connections that an object has. For an object, degree may be a measure of how central the object is compared to the objects to which it is connected. Thus, the degree values of objects may be used to identify hubs in the identified clusters.

In some embodiments, calculating the degree values may be accomplished before the clusters are identified at 918.

The identified clusters may be annotated at 922, which may be similar to enriching the cluster at step 906 in process 900 shown in FIG. 9A. Annotating the clusters at 922 may use the degree values calculated for the remaining nodes at 920. Annotating the clusters may include identifying hub objects in the clusters based on the degrees of the objects. For example, the hub object in a cluster may be the object with the highest degree value. Annotating the clusters may include naming or otherwise labelling the clusters based on their respective hub objects.

The clustered data model representation may be stored at 924, similar to step 908 in process 900 shown in FIG. 9A. This may include storing one or more copies of the transformed data model representation based on one or more iterations of the clustering process, or clustered data model representation files, data structures, or cluster metadata, or other storage format for cluster representation.

Example 9—User-Driven Data Model Clustering Processes

Figure 9C:
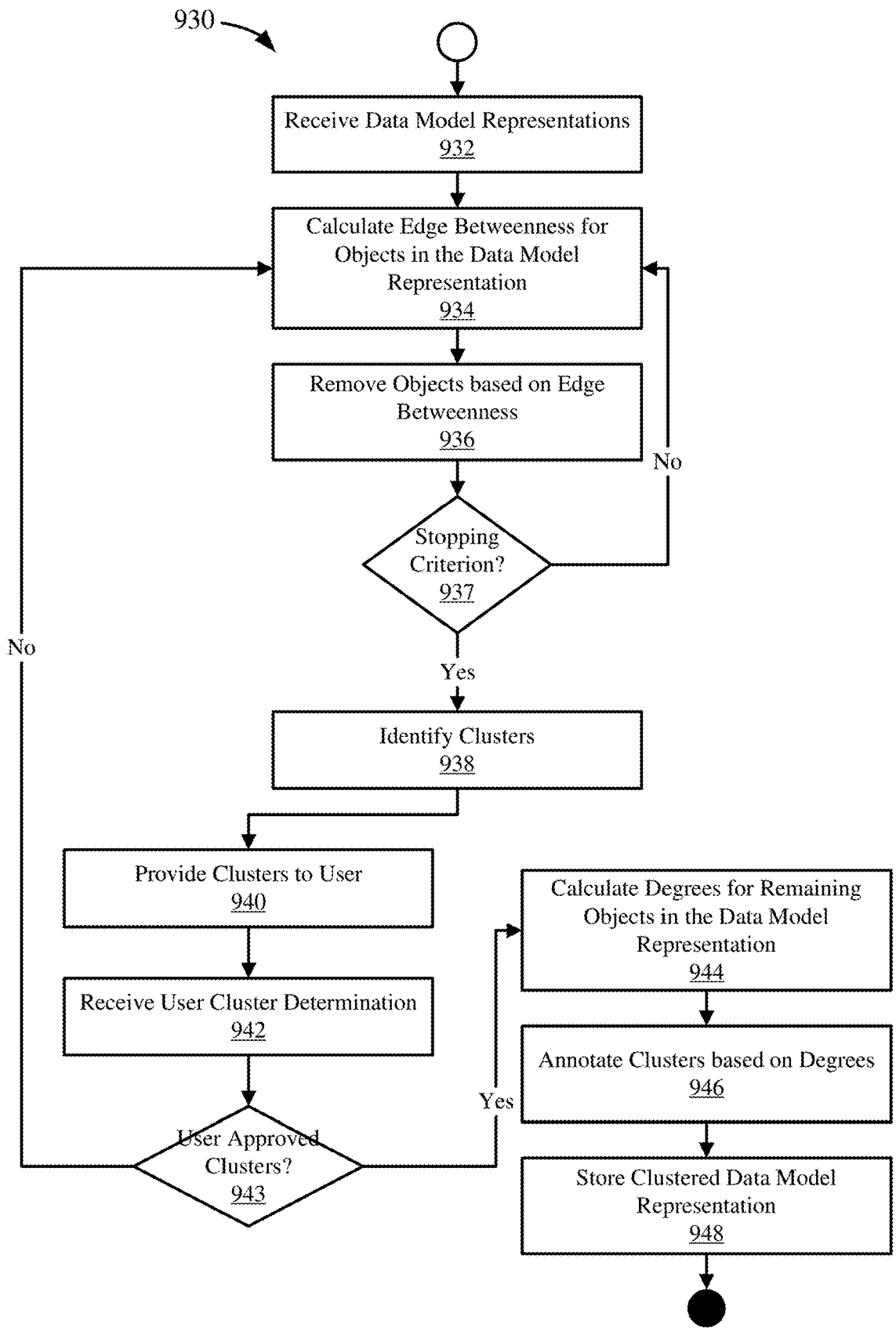
FIG. 9C is a flowchart illustrating a process for user-engaged data object clustering.

FIG. 9C is a flowchart illustrating a process 930 for user-confirmed data object clustering. Generally, the process 930 is similar to the process 910 shown in FIG. 9B, but with a few modifications to present one or more clustering options to a user during the process.

A data model representation may be received at 932, similar to step 912 in process 910 shown in FIG. 9B. Edge betweenness values may be calculated for objects in the data model representation at 934, similar to step 914 in process 910 shown in FIG. 9B. Data objects may be removed from the data model representation based on their edge betweenness at 936, similar to step 916 in process 910 shown in FIG. 9B. The process 930 determines at 937 if the stopping criteria has been reached (which could be based on user input) to stop dividing the data model representation into clusters at steps 934 and 936, similar to decision 917 in process 910 shown in FIG. 9B. One or more clusters may be identified at 938, similar to step 918 in process 910 shown in FIG. 9B.

The identified clusters may be provided to a user at 940. The clusters may be provided as a graphical representation or a textual representation, such as through a display. In some embodiments, the user may be another computing system that may display the clusters. In other embodiments, the user may be a heuristic or machine-learning algorithm, which may be trained to accept data model clusters for analysis, and further to select or otherwise determine the data model clusters as at step 942.

A user determination on the clusters may be received at 942. Generally, the user determination received may approve or decline the provided clusters. If the user approves the clusters ("yes" at 943), then the process 930 continues. If the user declines the clusters ("no" at 943), then the divisive clustering process performs another iteration, calculating new edge betweenness values at 934 and proceeding from there.

In some embodiments, the clusters may be provided at 940 after the degrees for the objects have been calculated at 944 and the clusters annotated at 946. Degree values may be calculated for objects in the data model representation at 944, similar to step 920 in process 910 shown in FIG. 9B. The identified clusters may be annotated at 946, similar to step 922 in process 910 shown in FIG. 9B.

In some embodiments, calculating the degree values at 944 and annotating the clusters at 946 may be performed before providing the clusters to a user at 940. In such embodiments, identifying the clusters at 938 may be performed after calculating the degrees (e.g. at step 944 when placed before providing to a user at 940). The clustered data model representation may be stored at 948, similar to step 924 in process 910 shown in FIG. 9B.

In some embodiments, the process 930 may provide multiple sets of clusters to a user at 940 for selection between the different clustering options. The process may generate separate clustering options through one or more iterations of steps 934 to 938, that may then be provided to a user (e.g. at 940). The user may then select a clustering option, rather than approve or decline a single clustering. In some embodiments, a user may also select to generate additional clustering options.

Figure 9D:
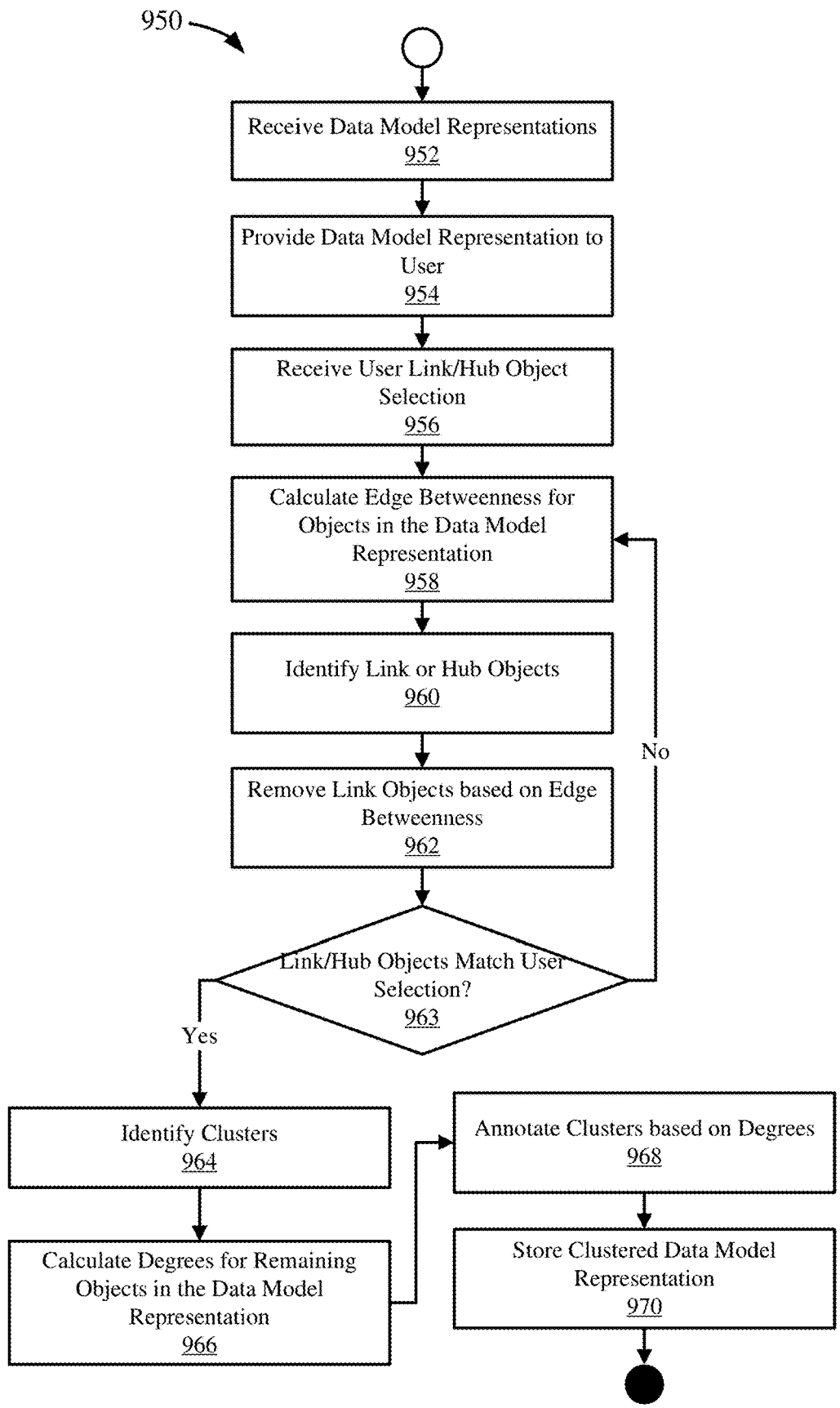
FIG. 9D is a flowchart illustrating a process for data object clustering based on user selections.

FIG. 9D is a flowchart illustrating a process 950 for data object clustering based on user selections. Generally, the process 950 is similar to the process 910 shown in FIG. 9B, but with a few modifications to make the iteration stopping criteria be one or more user-identified linking or hub objects (or both). A data model representation may be received at 952, similar to step 912 in process 910 shown in FIG. 9B.

The data model representation may be provided to a user at 954. The data model representation may be provided as a graphical representation or a textual representation, such as through a display. In some embodiments, the user may be another computing system that may display the data model representation. In other embodiments, the user may be a heuristic or machine-learning algorithm, which may be trained to accept a data model representation for analysis, and further to select or identify link or hub objects as at step 956.

One or more data object user selections may be received at 956. Generally, the user selections received may identify a linking object, or a hub object, or both (or multiple of each or either). The link/hub user selections may be received as annotations in the data model representation, or as a separate set of values or variables for use in the clustering process 950.

Edge betweenness values may be calculated for objects in the data model representation at 958, similar to step 914 in process 910 shown in FIG. 9B.

Link or hub objects (or both) may be identified at 960. Generally, the link or hub objects may be identified based on their edge betweenness values, as described herein. For example, the objects with the highest edge betweenness value may be identified as link objects, while objects with edge betweenness values below the highest value, or within a given range, may be identified as hub objects. Identification of the link or hub objects at 960 is generally integrated with removing the link objects, such as in processes 900, 910, 930 shown in FIGS. 9A-C, and may be similarly integrated here. Data objects may be removed from the data model representation based on their edge betweenness at 962, similar to step 916 in process 910 shown in FIG. 9B.

The process 950 determines at 963 if the stopping criteria has been reached to stop dividing the data model representation into clusters at steps 958, 960, and 962, similar to decision 917 in process 910 shown in FIG. 9B. The stopping criteria at decision 963 is to compare the user-selected link or hub objects at 956 to the link or hub objects identified at 960. If all the link or hub objects are the same, then the stopping criteria is reached and the process 950 continues ("yes" at 963). If one or more of the user-selected link or hub objects are not identified at 960, then the divisive clustering algorithm repeats another iteration ("no" at 963). Thus, the divisive clustering process may continue until all user-selected link or hub objects are identified (e.g. at step 960), and the link objects removed (e.g. at 962).

One or more clusters may be identified at 964, similar to step 918 in process 910 shown in FIG. 9B. Degree values may be calculated for objects in the data model representation at 966, similar to step 920 in process 910 shown in FIG. 9B. The identified clusters may be annotated at 968, similar to step 922 in process 910 shown in FIG. 9B. The clustered data model representation may be stored at 970, similar to step 924 in process 910 shown in FIG. 9B.

Example 10—Clustering a Data Model Example

FIGS. 10A-D are diagrams depicting an example process 1000 for data object clustering in a data model.

Figure 10A:
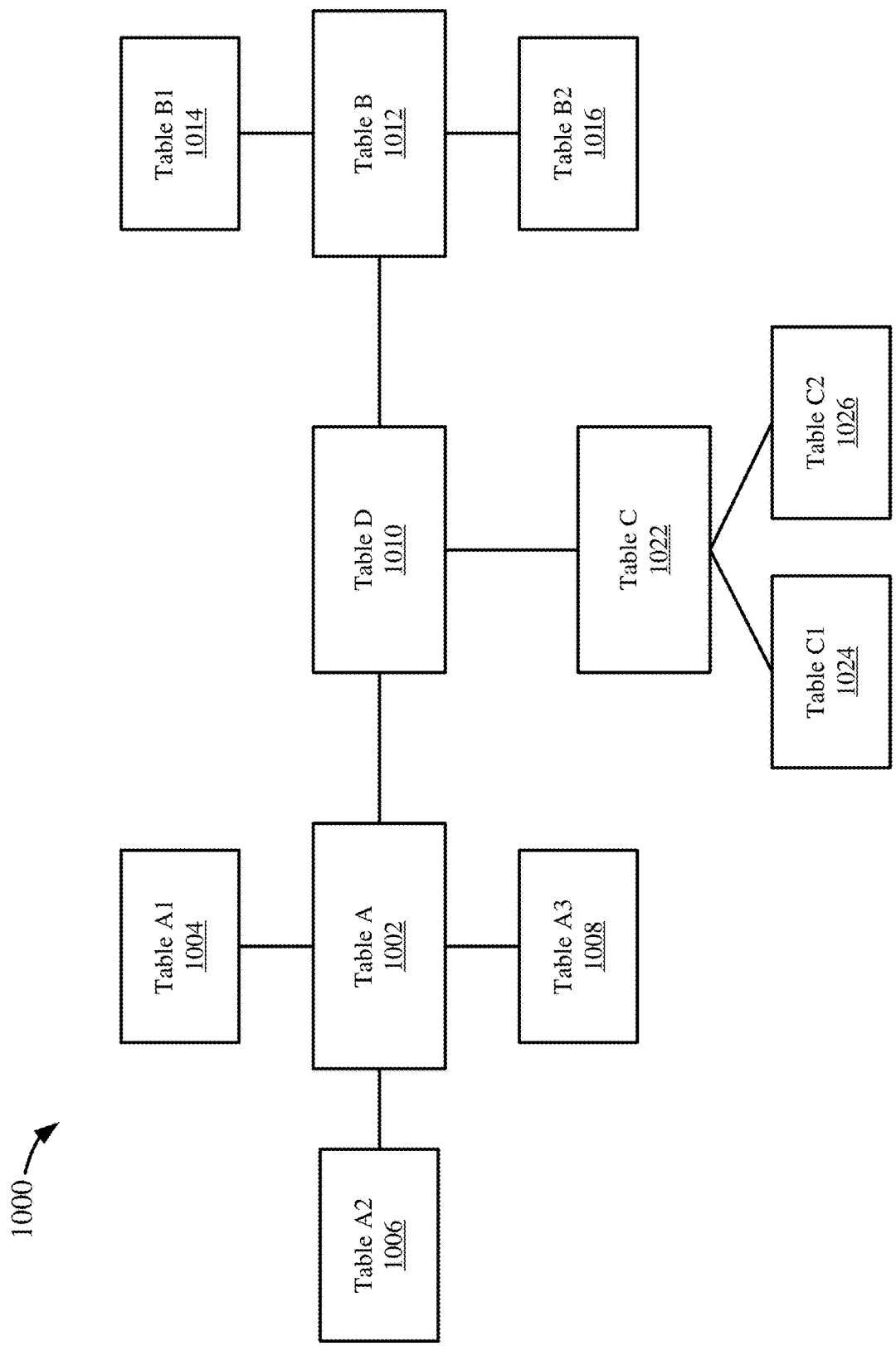
FIGS. 10A-D are diagrams depicting an example process for data object clustering in a data model.

FIG. 10A illustrates the beginning of the example 1000 for data clustering, such as a representation of a database that may be received for clustering, such as at step 902 in process 900 shown in FIG. 9A. The database may have table A 1002, table A1 1004, table A2 1006, table A3 1008, table D 1010, table B 1012, table B1 1014, table B2 1016, table C 1022, table C1 1024, and table C 1026, connected as depicted (e.g. by foreign keys or associations). The tables 1002, 1004, 1006, 1008, 1010, 1012, 1014, 1016, 1022, 1024, 1026 may be nodes in a representation, such as a graph representation, of the database.

Figure 10B:
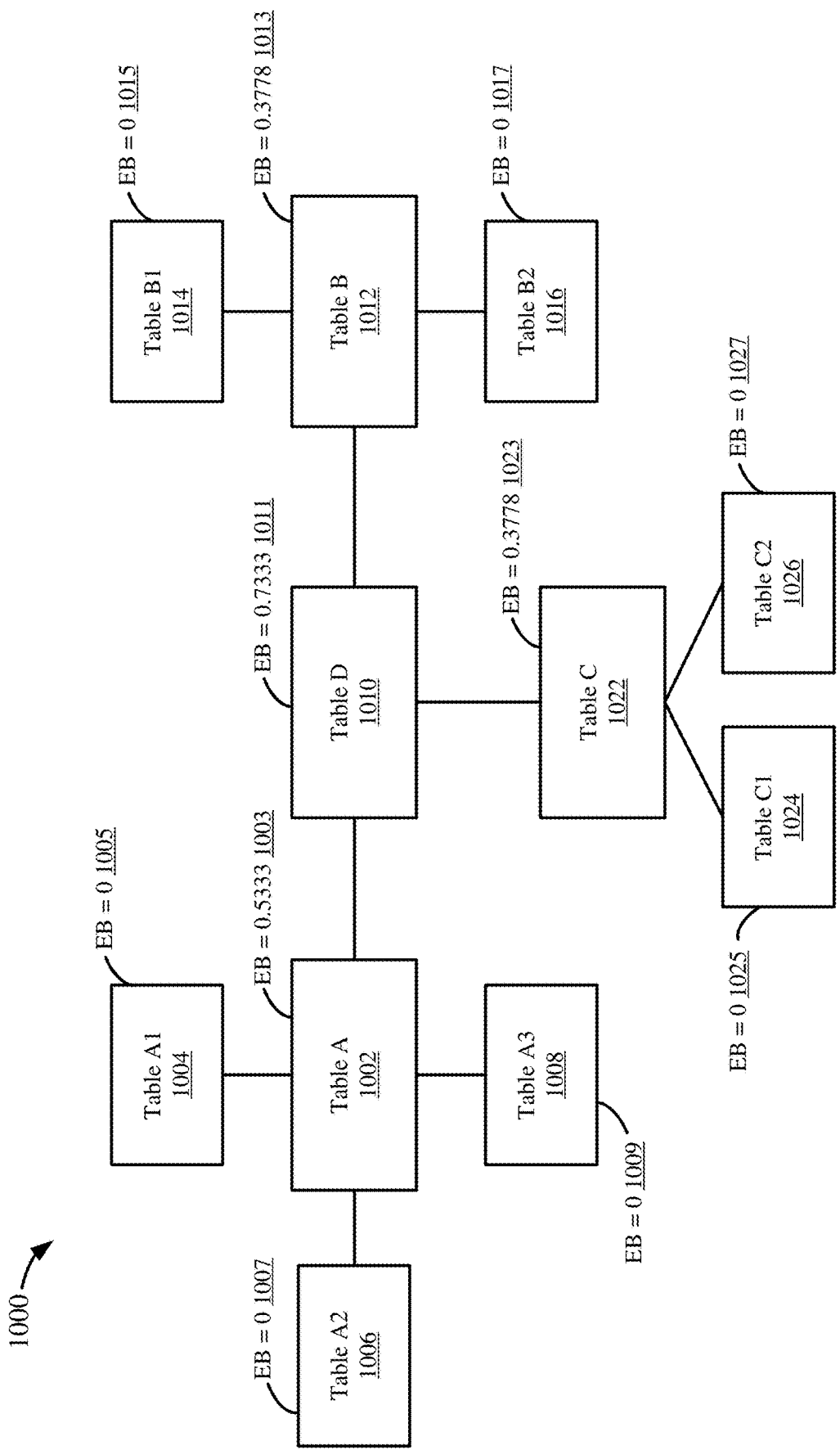

FIG. 10B continues the example 1000 for data object clustering, illustrating such steps as 904 in process 900 shown in FIG. 9A (in part) and 914 in process 910 shown in FIG. 9B. An edge betweenness value 1003 is calculated for table A 1002 as 0.5333 (EB=0.5333). The edge betweenness value 1003 is calculated as a measure of the number of shortest paths between two other tables which include table A 1002, as described herein. For example, table A1 1004 and table A3 1008 have a shortest path which includes table A 1002, while table C1 1024 and table C2 1026 do not have a shortest path between them that includes table A. Further, the shortest path from table A1 1004 to table C1 1024 also includes table A 1002, while there is not a shortest path from table B1 1014 to table C1 1024 that includes table A. When calculating the edge betweenness value for table A 1003, all the shortest paths between the other tables 1004, 1006, 1008, 1010, 1012, 1014, 1016, 1022, 1024, 1026 are determined, and the edge betweenness value for table A is weighted based on the number of those shortest paths that include table A 1002, such as in equation 1 described herein.

This calculation is repeated for all the tables (e.g. data objects) in the analyzed data model. An edge betweenness value is calculated for table A1 1005 as 0, because table A1 1004 is not on a direct path (shortest or otherwise) between any two other tables. An edge betweenness value is calculated for table A2 1007 as 0. An edge betweenness value is calculated for table A3 1009 as 0.

An edge betweenness value is calculated for table B 1013 as 0.3778. An edge betweenness value is calculated for table B1 1015 as 0. An edge betweenness value is calculated for table B2 1017 as 0. An edge betweenness value is calculated for table C 1023 as 0.3778. The edge betweenness values for table B and table C 1013, 1023 are the same because tables B and C 1012, 1022 have a similar structural connection with the rest of the database. An edge betweenness value is calculated for table C1 1025 as 0. An edge betweenness value is calculated for table C2 1027 as 0. An edge betweenness value is calculated for table D 1011 as 0.7333. Thus, table D 1010 has the highest calculated edge betweenness value.

Figure 10C:
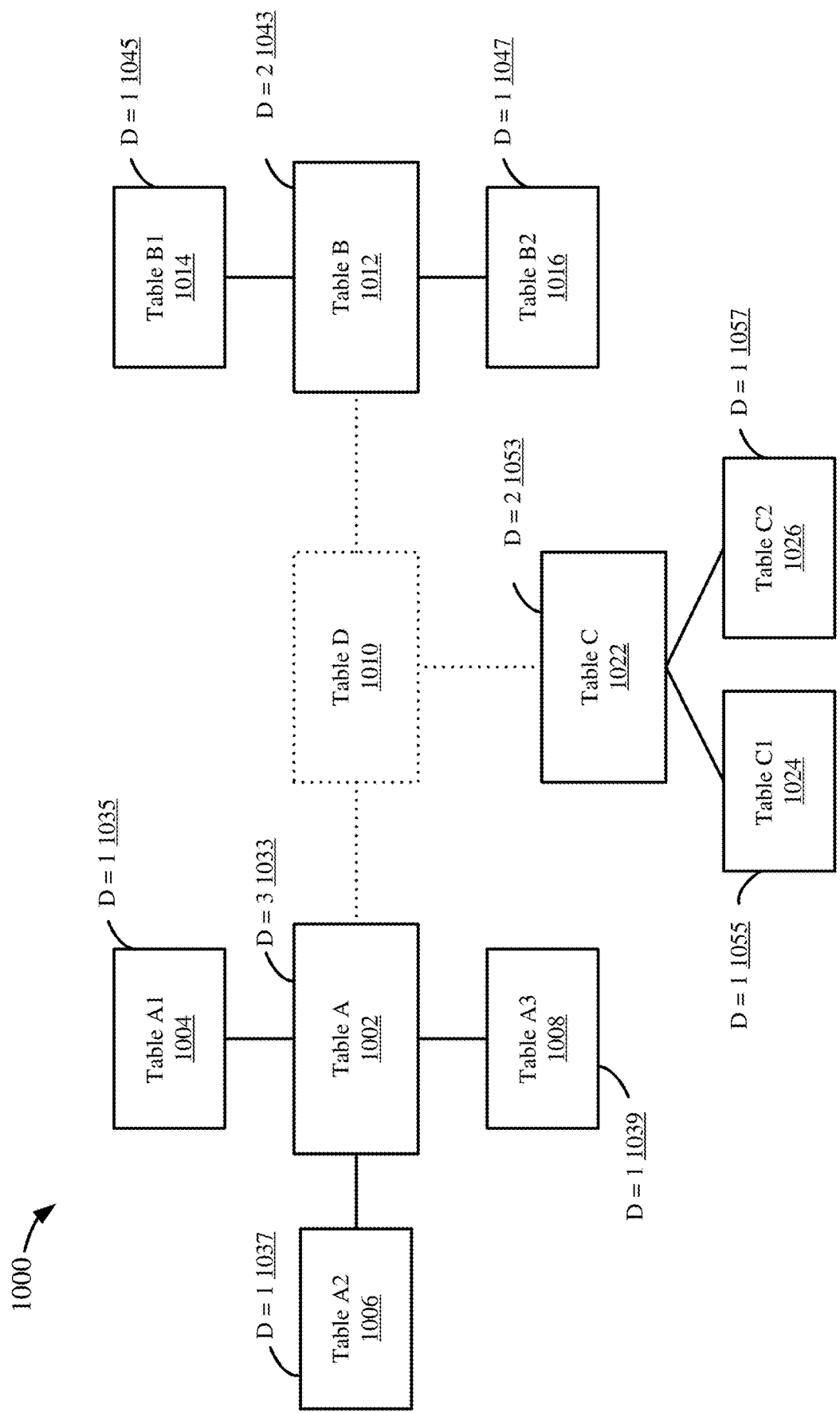

FIG. 10C continues the example 1000 for data object clustering, illustrating such steps as 904 and 906 in process 900 shown in FIG. 9A (in part) and 916 and 920 in process 910 shown in FIG. 9B. Table D 1010 may be removed, as described herein, because it had the highest edge betweenness value 1011 of 0.7333, compared to the edge betweenness values of the other tables 1003, 1005, 1007, 1009, 1013, 1015, 1017, 1023, 1025, 1027.

Degree values may be calculated for the remaining tables 1002, 1004, 1006, 1008, 1012, 1014, 1016, 1022, 1024, 1026. Thus, a degree value is not calculated for table D 1010 because it was removed. The degree values may be calculated based on the number of edges or connections each table has, as described herein. For example, the degree values may be a count of the number of edges, as depicted.

A degree value is calculated for table A 1033 as 3 (D=3) because table A 1002 has three edges connecting it to tables A1, A2, A3 1004, 1006, 1008. A degree value is calculated for table A1 1035 as 1. A degree value is calculated for table A2 1037 as 1. A degree value is calculated for table A3 1039 as 1.

A degree value is calculated for table B 1043 as 2. A degree value is calculated for table B1 1045 as 1. A degree value is calculated for table B2 1047 as 1.

A degree value is calculated for table C 1053 as 2. The degree values for table B and table C 1043, 1053 are the same because tables B and C 1012, 1022 have the same number of connections with other tables in the database. A degree value is calculated for table C1 1055 as 1. A degree value is calculated for table C2 1057 as 1.

Figure 10D:
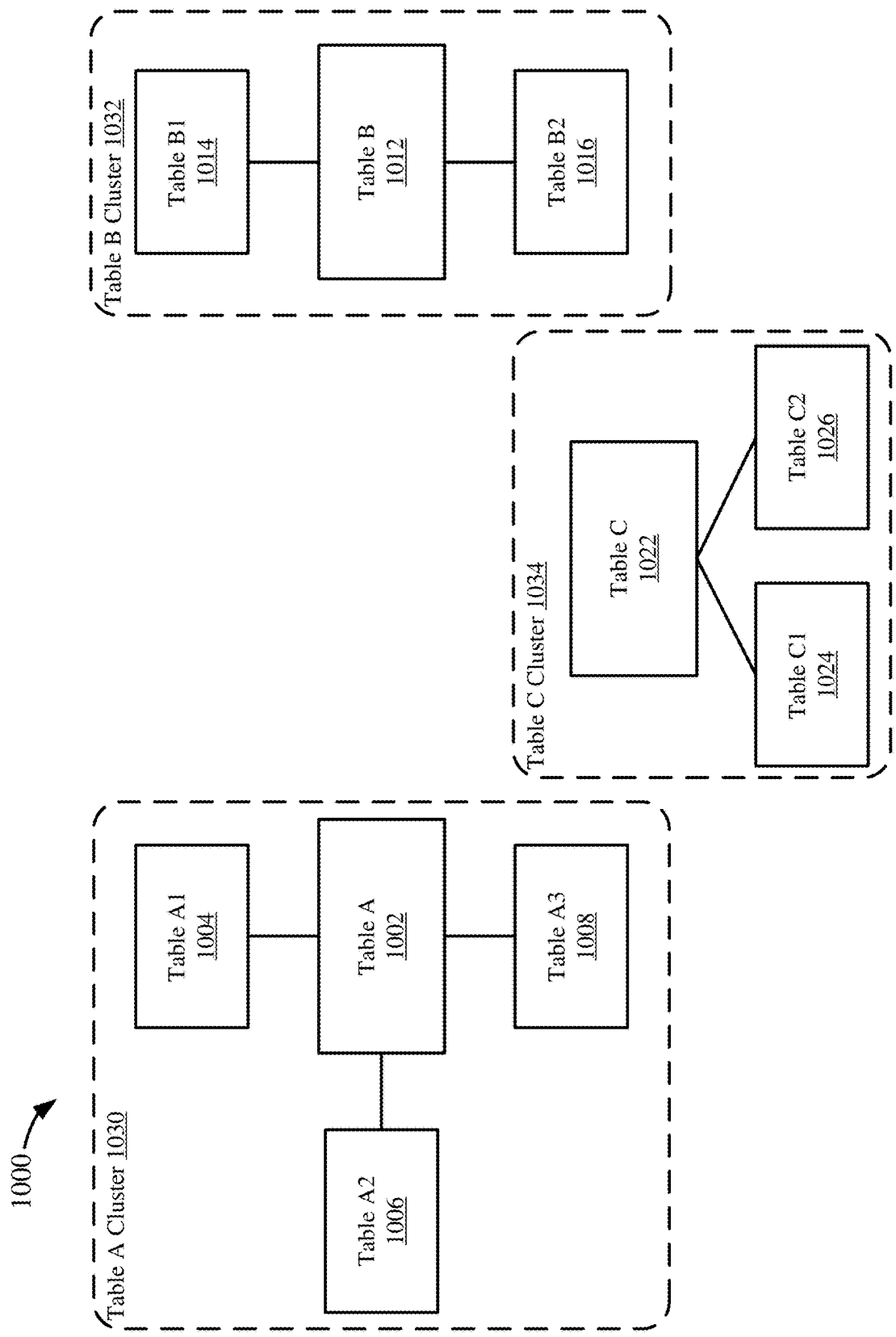

FIG. 10D ends the example 1000 for data object clustering, illustrating such steps as 904 and 906 in process 900 shown in FIG. 9A (in part) and 918 and 922 in process 910 shown in FIG. 9B. Based on the removal of the linking table, table D 1010, table clusters may now be identified. The clusters 1030, 1032, 1034 may be identified as the interconnected groups of tables which are no longer connected with each other, based on the removal of the linking table 1010.

Thus, a cluster 1030 is identified having table A 1002, table A1 1004, table A2 1006, and table A3 1008, because those tables remain connected with each other in the database representation. The cluster 1030 is identified as the "Table A Cluster" based on table A 1002 being the hub table for the cluster, as it has the highest degree value 1033 (D=3) compared to the degrees of the other tables in the cluster (D=1) 1035, 1037, 1039.

Another cluster 1032 is identified having table B 1012, table B1 1014, and table B2 1016, because those tables remain connected with each other in the database representation. This cluster 1032 is identified as the "Table B Cluster" based on table B 1012 being the hub table for the cluster, as it has the highest degree value 1043 (D=2) compared to the degrees of the other tables in the cluster (D=1) 1045, 1047.

A third cluster 1034 is identified having table C 1022, table C1 1024, and table C2 1026, because those tables remain connected with each other in the database representation. This cluster 1034 is identified as the "Table C Cluster" based on table C 1022 being the hub table for the cluster, as it has the highest degree value 1053 (D=2) compared to the degrees of the other tables in the cluster (D=1) 1055, 1057.

Accordingly, the tables of the database in this example 1000 have been clustered after a single iteration of clustering, as described herein. The clusters 1030, 1032, 1034 may be stored, such as by storing the modified data representation with the cluster information (e.g. with the linking table 1010 removed with annotations for the cluster names), or by storing metadata objects in the data representation to identify the clusters, or in another storage or file format. The clusters 1030, 1032, 1034 may be provided to users as a simplified and more easily understood version of the database, or used in other database analytical processes, such as database or schema mapping to other databases.

Example 11—Data Model Clustering in User Interfaces

Figure 11A:
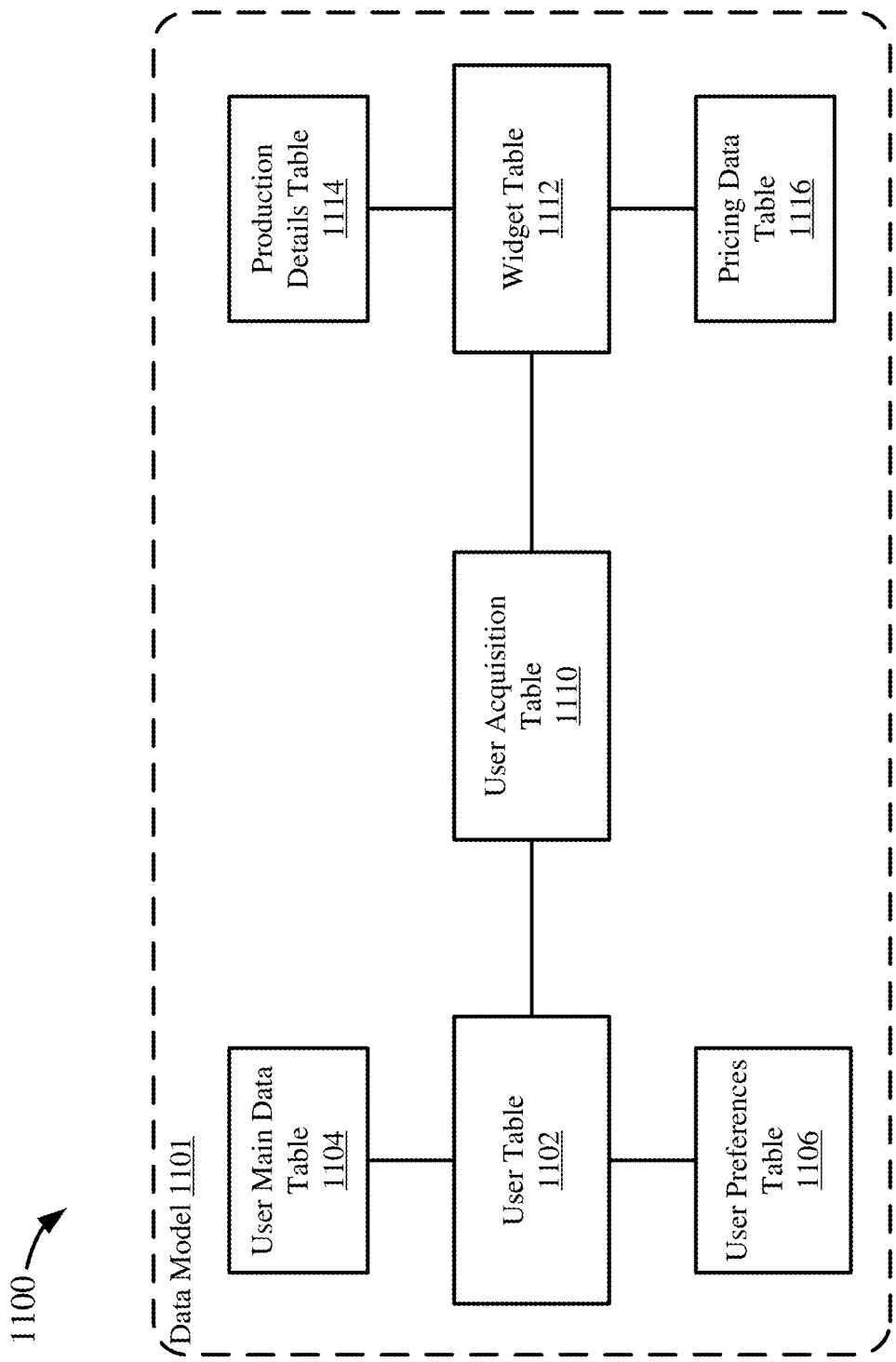
FIGS. 11A-C are diagrams depicting an example process for user-engaged data object clustering and clustering displays.
Figure 11B:
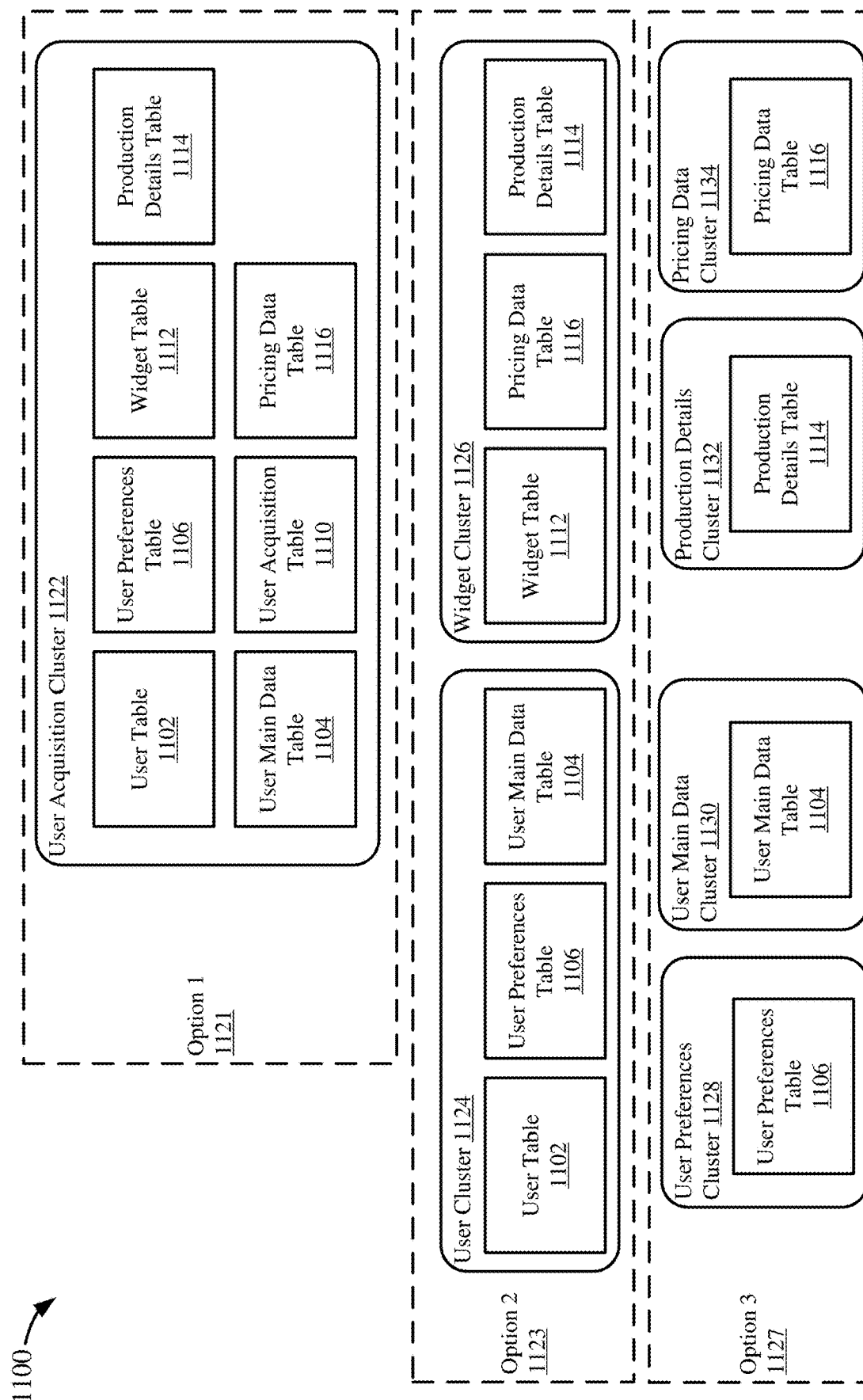
Figure 11C:
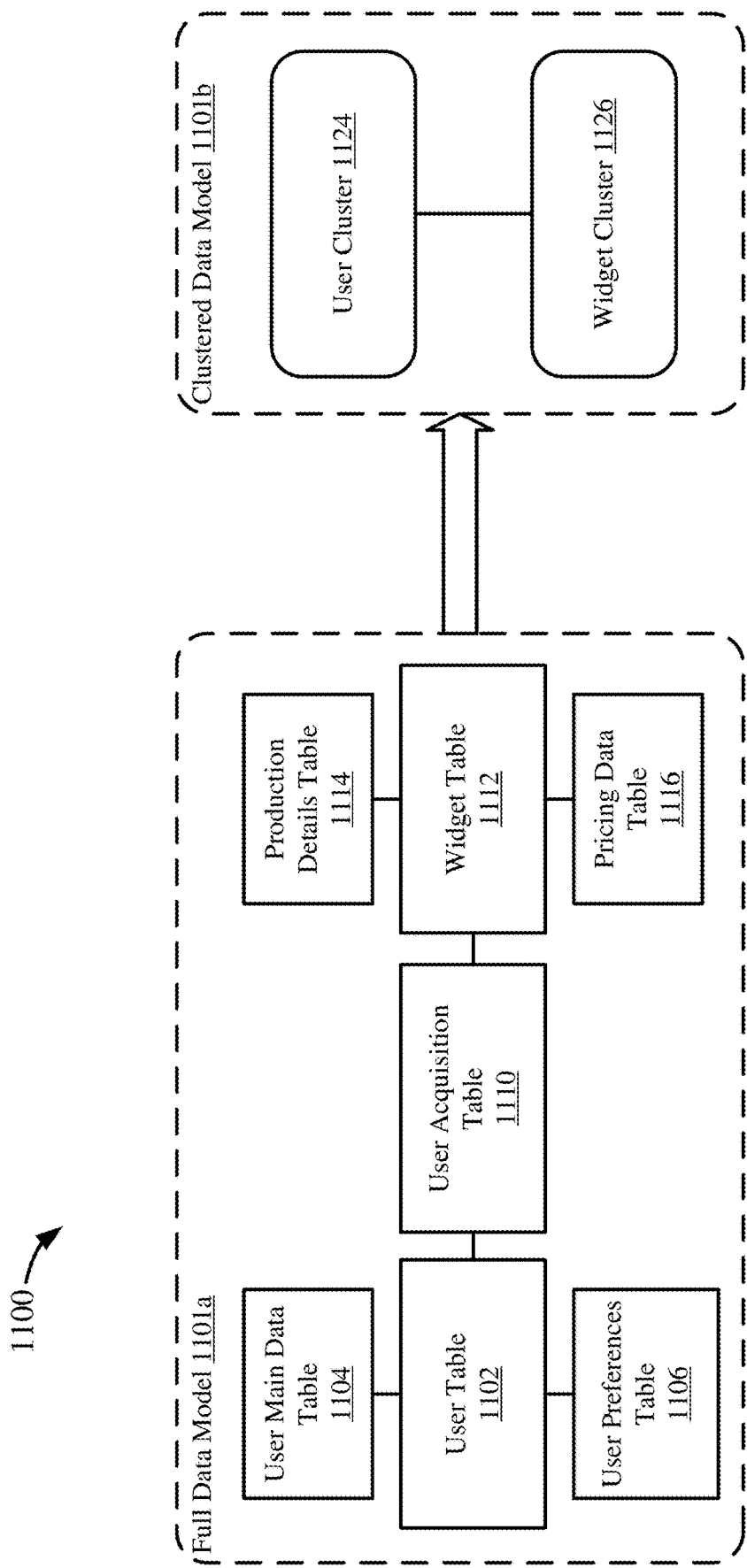

FIG. 11A-C are diagrams depicting an example process 1100 for user-engaged data object clustering and clustering displays.

FIG. 11A illustrates the beginning of the example 1100 for data clustering, such as in a representation of a data model 1101 for a database that may be received for clustering, such as at step 902 in process 900 shown in FIG. 9A. The database data model 1101 may store user, widget, and acquisition information. Such information may be stored in a User Table 1102, a User Main Data Table 1104, a User Preferences Table 1106, a Widget Table 1112, a Production Details Table 1114, a Pricing Data Table 1116, and a User Acquisition Table 1110, connected as depicted (e.g. by foreign keys). The tables 1102, 1104, 1106, 1110, 1112, 1114, 1116 may be nodes in a representation of the data model 1101, such as a graph representation. The data model 1101 may be clustered, as described herein.

Continuing the example 1100, FIG. 11B illustrates several options 1121, 1123, 1127 for clustering the data model 1101, such as may be provided at step 940 in process 930 shown in FIG. 9C.

Option 1 1121 may provide a single cluster 1122. A single cluster scenario may occur when no linking objects are identified, and so no objects are removed, such as if no edge betweenness value meets a threshold value for identifying linking objects. Option 1 1121 may be the result from a first iteration of the divisive clustering process described herein, such as the process 910 shown in FIG. 9B. The single cluster 1122 in option 1 1121 may have all the tables of the data model 1101. The User Acquisition Table 1110 may be identified as a hub table, having the highest degree (number of edges or connections), and so the cluster may be named the "User Acquisition Cluster."

Option 2 1123 may provide two clusters 1124, 1126. Option 2 1123 may be the result from a second iteration of the divisive clustering process as used for Option 1 1121. In this iteration, the User Acquisition Table 1110 may be identified as a linking table, and so be removed. This results in two clusters 1124, 1126.

The User Cluster 1124 may have the User Table 1102, the User Preferences Table 1106, and the User Main Data Table 1104, and be so named because the User Table is identified as the hub table as it has the highest degree value. The Widget Cluster 1126 may have the Widget Table 1112, the Pricing Data Table 1116, and the Production Details Table 1114, and be so named because the Widget Table is identified as the hub table as it has the highest degree value.

Option 3 1127 may provide four clusters 1128, 1130, 1132, 1134. Option 3 1127 may be the result from a third iteration of the divisive clustering process as used for Option 1 1121 and Option 2 1123. In this iteration, the User Table 1102 and the Widget Table 1112 may both be identified as linking tables, and so be removed. This results in four clusters 1128, 1130, 1132, 1134.

The User Preferences Cluster 1128 may have the User Preferences Table 1106, and be so named because the User Preferences Table is identified as the hub table as it has the highest degree value (and is the only table in the cluster). The User Main Data Cluster 1130 may have the User Main Data Table 1104, and be so named because the User Main Data Table is identified as the hub table as it has the highest degree value (and is the only table in the cluster). The Production Details Cluster 1132 may have the Production Details Table 1114, and be so named because the Production Details Table is identified as the hub table as it has the highest degree value (and is the only table in the cluster). The Pricing Data Cluster 1134 may have the Pricing Data Table 1116, and be so named because the Pricing Data Table is identified as the hub table as it has the highest degree value (and is the only table in the cluster).

Generally, option 1 1121 may be a coarse-grained clustering of the data model 1101, while option 2 1123 is a medium-grained clustering of the data model and option 3 1127 is a fine-grained clustering of the data model.

These three options 1121, 1123, 1127 may be provided to a user for review and selection, such as described in the process 930 shown in FIG. 9C. In some embodiments, the options 1121, 1123, 1127 may be provided iteratively, as they are generated, allowing a user to select one or precede to the next option (or back to a previous option). Alternatively or additionally, the options 1121, 1123, 1127 may be provided to a user at the same time, allowing a user to review the options together and then make a selection (or select to obtain additional options or previously generated options). Thus, multiple copies of clustered data model representations may be generated through the clustering techniques described herein, and stored as temporary representations or clustering data structures or files.

In some embodiments, the options 1121, 1123, 1127 may be provided to a heuristic or machine-learning algorithm for selection, or further refinement of the data clustering.

FIG. 11C ends the example 1100 for data object clustering, illustrating such steps as 908 in process 900 shown in FIG. 9A (in part) and 942 in process 930 shown in FIG. 9C. Option 2 1123 is selected as the appropriate clustering of the data model 1101. Thus, the full data model 1101*a* may be transformed into the clustered data model 1101*b*. The clustered data model 1101*b* may have two data objects representing the clusters as determined, a User Cluster 1124 and a Widget Cluster 1126, which are arranged (e.g. connected) as depicted.

The clustered data model 1101*b* may be used in place of the full data model 1101*a* when simplification is beneficial, such as in initial analysis of the full data model, reporting on the full data model, and so on.

The clustered data model 1101*b* may be an additional representation of the full data model 1101*a*, and may include references to the full data model or the tables therein. Such references may be useful for accessing the tables within the clusters 1124, 1126 for drill-down analysis when viewing or otherwise using the clustered data model 1101*b*. Additionally or alternatively, the clustered data model 1101*b* may be integrated with the full data model 1101*a*, such as by including clustering fields within the representations of the tables in the full data model, or metadata representations of the clusters (e.g. additional nodes defining the clusters that reference the objects within the clusters).

Example 12—Data Model Clustering Module Environments

Figure 12A:
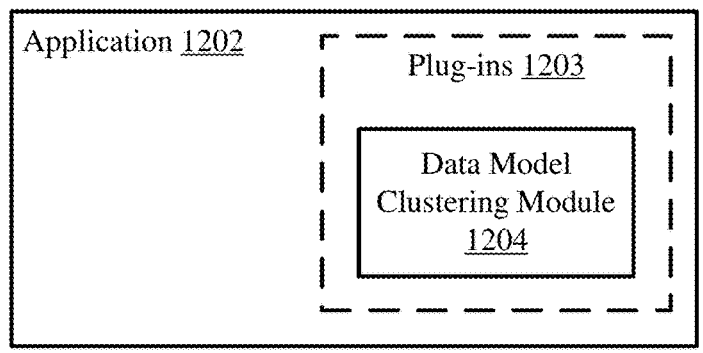
FIG. 12A is a schematic diagram depicting an application environment for a data model clustering module.

FIG. 12A is a schematic diagram depicting an application environment for a data model clustering module 1204, which may provide data object clustering functionality as described herein. An application 1202, such as a software application running in a computing environment, may have one or more plug-ins 1203 (or add-ins or other software extensions to programs) that add functionality to, or otherwise enhance, the application. The data model clustering module 1204 may be integrated with the application 1202; for example, the data model clustering module may be integrated as a plug-in. The data model clustering module 1204 may add functionality to the application 1202 for data object clustering, which may be displayed in a user interface or otherwise provided to a user. For example, the application 1202 may be a database or data modeling application, or a database management application, and the data model clustering module 1204 may be integrated with the database or data management application to provide data object clustering functionality.

Figure 12B:
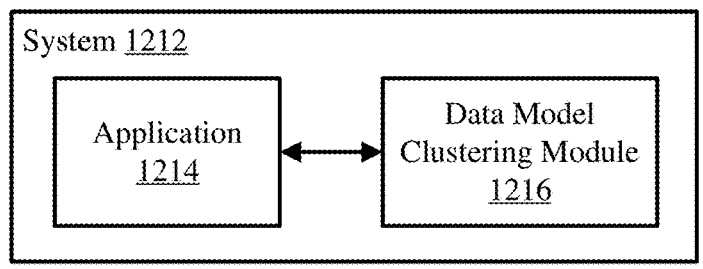
FIG. 12B is a schematic diagram depicting a system environment for a data model clustering module.

FIG. 12B is a schematic diagram depicting a system environment for a data model clustering module 1216, which may provide data object clustering functionality as described herein. The data model clustering module 1216 may be integrated with a computer system 1212. The computer system 1212 may include an operating system, or otherwise be a software platform, and the data model clustering module 1216 may be an application or service running in the operating system or platform, or the data model clustering module may be integrated within the operating system or platform as a service or functionality provided through the operating system or platform. The system 1212 may be a server or other networked computer or file system. Additionally or alternatively, the data model clustering module 1216 may communicate with and provide data object clustering functionality, as described herein, to one or more applications 1214, such as a database, data modeling, or database management applications, in the system 1212.

Figure 12C:
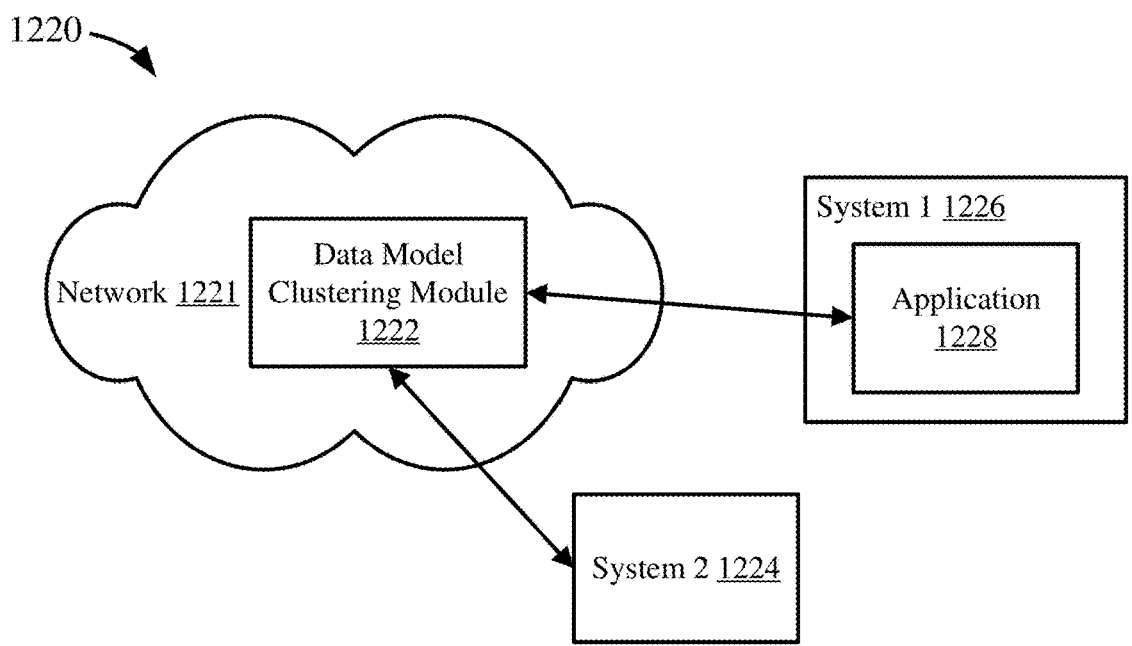
FIG. 12C is a schematic diagram depicting a network environment for a data model clustering module.

FIG. 12C is a schematic diagram depicting a network environment 1220 for a data model clustering module 1222, which may provide data object clustering functionality as described herein. The data model clustering module 1222 may be available on a network 1221, or integrated with a system (such as from FIG. 12B) on a network. Such a network 1221 may be a cloud network or a local network. The data model clustering module 1222 may be available as a service to other systems on the network 1221 or that have access to the network (e.g., may be on-demand software or SaaS). For example, system 2 1224 may be part of, or have access to, the network 1221, and so can utilize data object clustering functionality from the data model clustering module 1222. Additionally, system 1 1226, which may be part of or have access to the network 1221, may have one or more applications, such as application 1228, that may utilize data object clustering functionality from the data model clustering module 1222.

In these ways, the data model clustering module 1204, 1216, 1222 may be integrated into an application, a system, or a network, to provide data object clustering functionality as described herein.

Example 13—Additional Data Clustering Processes

Figure 13A:
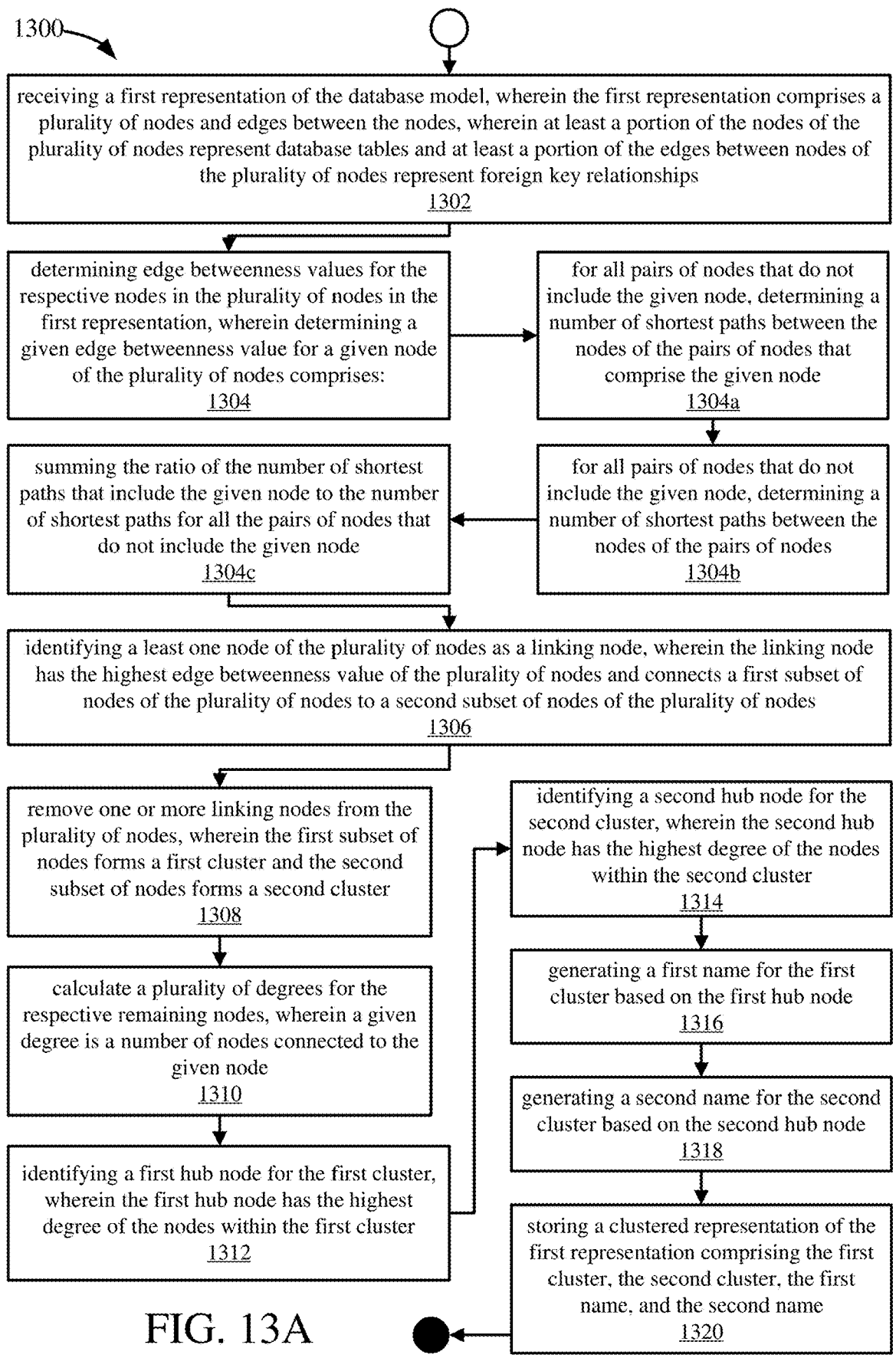
FIG. 13A illustrates a process for arranging database objects in a database model into clusters.

FIG. 13A illustrates a process 1300 for arranging database objects in a database model into clusters. The processes 1300, 1330, 1360 may be implemented by one or more computing devices comprising at least one hardware processor and one or more tangible memories coupled to the at least one hardware processor. A first representation of the database model may be received at 1302. The first representation may include a plurality of nodes and edges between the nodes, and at least a portion of the nodes of the plurality of nodes may represent database tables and at least a portion of the edges between nodes of the plurality of nodes may represent foreign key relationships.

Edge betweenness values may be determined for the respective nodes in the plurality of nodes in the first representation at 1304. Determining a given edge betweenness value for a given node of the plurality of nodes may include, for all pairs of nodes that do not include the given node, determining a number of shortest paths between the nodes of the pairs of nodes that comprise the given node at 1304*a*. Determining a given edge betweenness value for a given node of the plurality of nodes may include, for all pairs of nodes that do not include the given node, determining a number of shortest paths between the nodes of the pairs of nodes at 1304*b*. Determining a given edge betweenness value for a given node of the plurality of nodes may include summing the ratio of the number of shortest paths that include the given node to the number of shortest paths for all the pairs of nodes that do not include the given node at 1304*c*.

A least one node of the plurality of nodes may be identified as a linking node at 1306. The linking node may have the highest edge betweenness value of the plurality of nodes and may connect a first subset of nodes of the plurality of nodes to a second subset of nodes of the plurality of nodes. One or more linking nodes may be removed from the plurality of nodes at 1308. The first subset of nodes may form a first cluster and the second subset of nodes may form a second cluster. A plurality of degrees may be calculated for the respective remaining nodes at 1310. A given degree may be a count of the number of nodes connected to the given node.

A first hub node for the first cluster may be identified at 1312. The first hub node may have the highest degree of the nodes within the first cluster. A second hub node for the second cluster may be identified at 1314. The second hub node may have the highest degree of the nodes within the second cluster. A first name for the first cluster may be generated based on the first hub node at 1316. A second name for the second cluster may be generated based on the second hub node at 1318. A clustered representation of the first representation may be stored at 1320. The clustered representation may include the first cluster, the second cluster, the first name, and the second name.

Figure 13B:
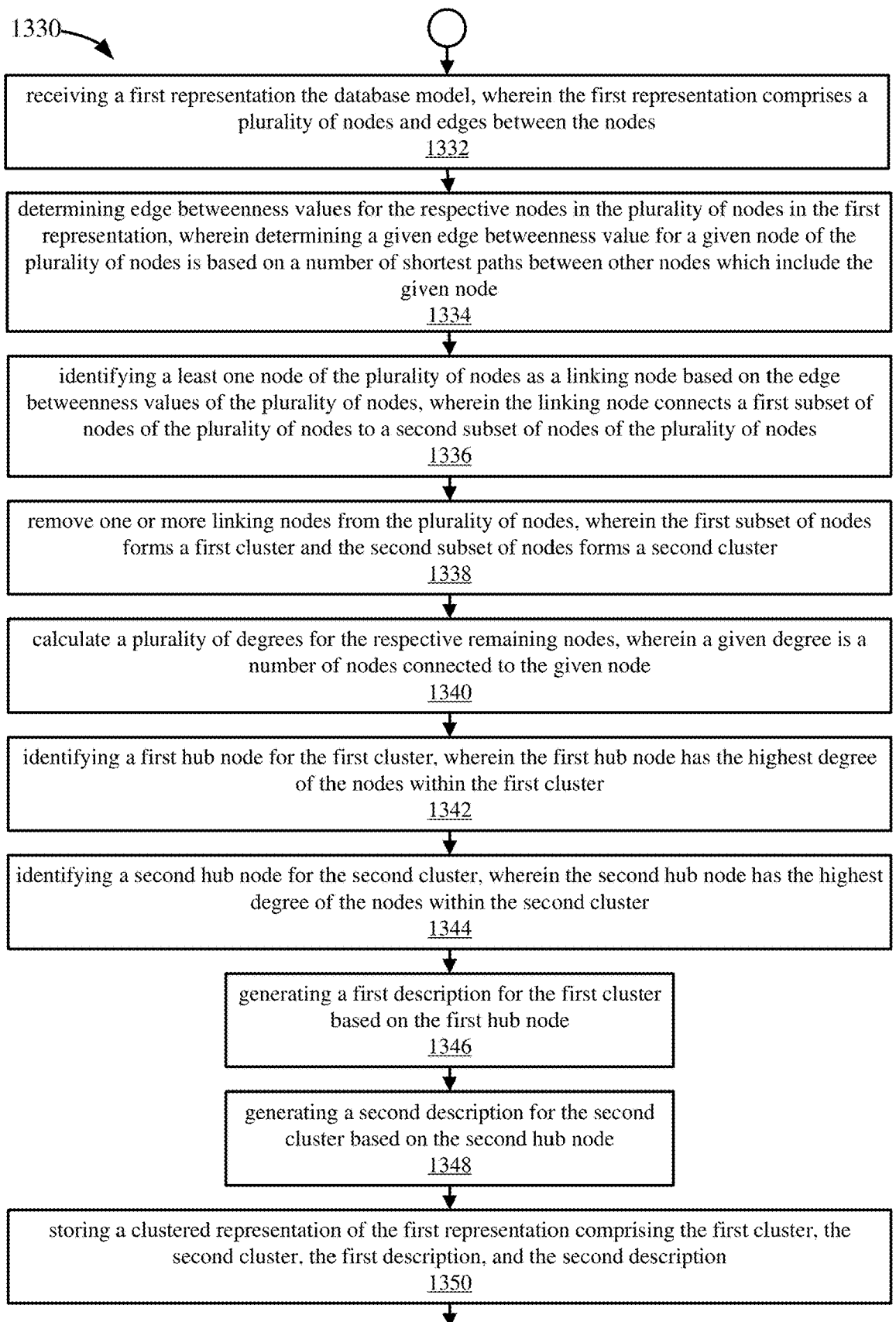
FIG. 13B illustrates a process for generating clusters in a database model.

FIG. 13B illustrates a process 1330 for generating clusters in a database model. The processes 1300, 1330, 1360 may be performed by one or more non-transitory computer-readable storage media storing computer-executable instructions for causing a computing system to perform the method. A first representation of the database model may be received at 1332. The first representation may include a plurality of nodes and edges between the nodes.

Edge betweenness values may be determined at 1334 for the respective nodes in the plurality of nodes in the first representation. Determining a given edge betweenness value for a given node of the plurality of nodes may be based on a number of shortest paths between other nodes which include the given node. At least one node of the plurality of nodes may be identified at 1336 as a linking node based on the edge betweenness values of the plurality of nodes. The linking node may connect a first subset of nodes of the plurality of nodes to a second subset of nodes of the plurality of nodes. One or more linking nodes may be removed at 1338 from the plurality of nodes. The first subset of nodes may form a first cluster and the second subset of nodes may form a second cluster.

A plurality of degrees for the respective remaining nodes may be calculated at 1340. A given degree may be based on the number of nodes connected to the given node. A first hub node may be identified at 1342 for the first cluster. The first hub node may have the highest degree of the nodes within the first cluster. A second hub node may be identified at 1344 for the second cluster. The second hub node may have the highest degree of the nodes within the second cluster. A first description may be generated at 1346 for the first cluster based on the first hub node. A second description may be generated at 1348 for the second cluster based on the second hub node. A clustered representation of the first representation may be stored at 1350. The clustered represent may include the first cluster, the second cluster, the first description, and the second description.

Figure 13C:
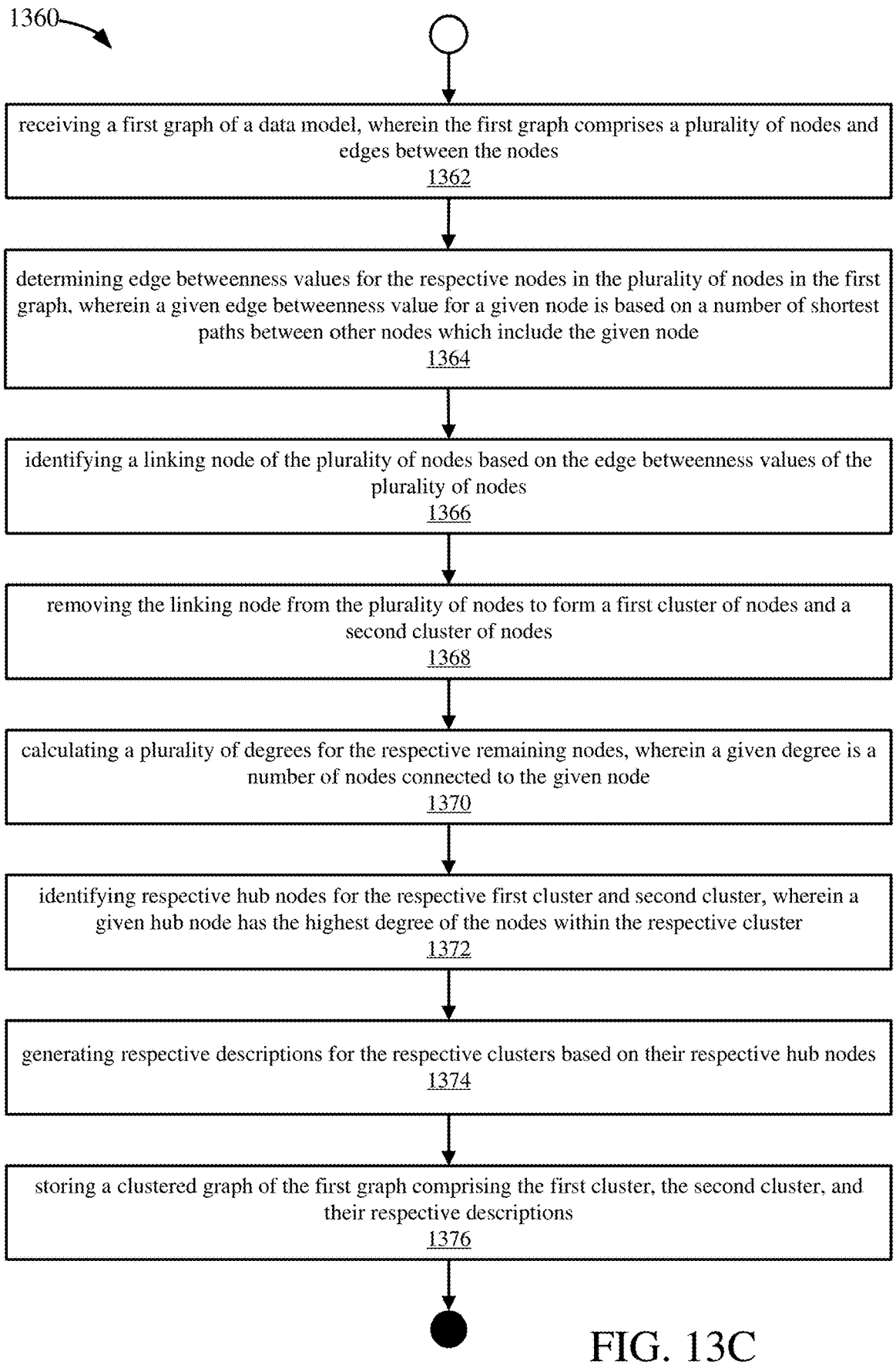
FIG. 13C illustrates a process for data model clustering.

FIG. 13C illustrates a process 1360 for data model clustering. The processes 1300, 1330, 1360 may be performed by a system, the system having one or more memories, one or more processing units coupled to the one or more memories, and one or more computer-readable storage media storing instructions that, when loaded into the one or more memories, cause the one or more processing units to perform data object clustering operations.

A first graph of a data model may be received at 1362. The first graph may include a plurality of nodes and edges between the nodes. Edge betweenness values may be determined at 1364 for the respective nodes in the plurality of nodes in the first graph. A given edge betweenness value for a given node may be based on a number of shortest paths between other nodes which include the given node.

A linking node of the plurality of nodes may identified at 1366 based on the edge betweenness values of the plurality of nodes. The linking node may be removed at 1368 from the plurality of nodes to form a first cluster of nodes and a second cluster of nodes.

A plurality of degrees may be calculated at 1370 for the respective remaining nodes. A given degree may be based on the number of nodes connected to the given node. Respective hub nodes may be identified at 1372 for the respective first cluster and second cluster. A given hub node may have the highest degree of the nodes within the respective cluster. Respective descriptions for the respective clusters may be generated at 1374 based on their respective hub nodes. A clustered graph of the first graph may be stored at 1376. The clustered graph may include the first cluster, the second cluster, and their respective descriptions.

Example 14—Computing Systems

Figure 14:
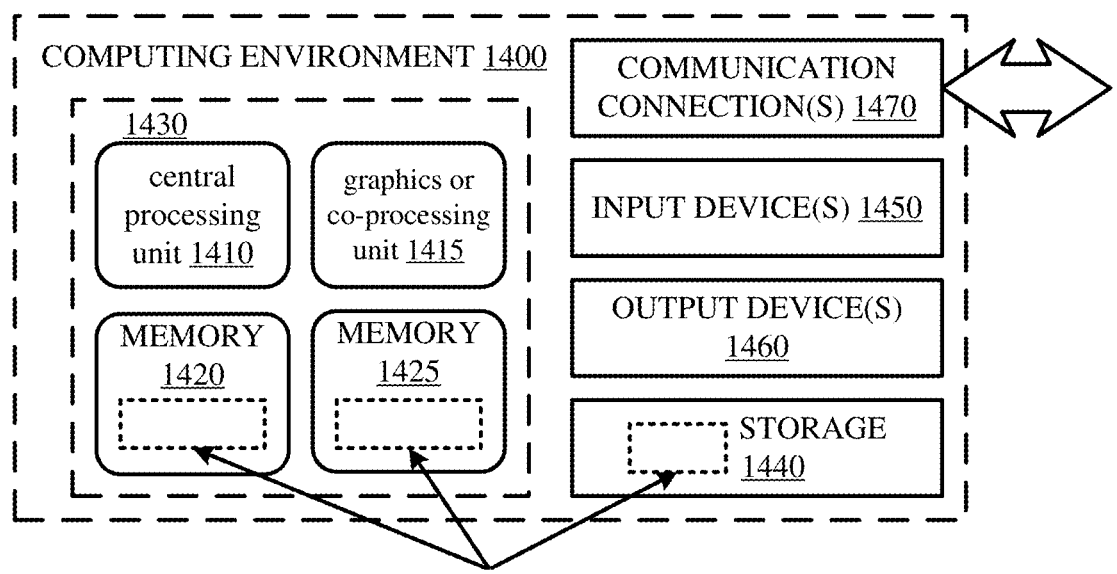
FIG. 14 is a diagram of an example computing system in which described embodiments can be implemented.

FIG. 14 depicts a generalized example of a suitable computing system 1400 in which the described innovations may be implemented. The computing system 1400 is not intended to suggest any limitation as to scope of use or functionality of the present disclosure, as the innovations may be implemented in diverse general-purpose or special-purpose computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions, such as for implementing components of the processes of FIGS. 9A-D and 13A-C, the systems of FIGS. 8A and 12A-C, or the databases, data representations, and displays of FIGS. 1-7, 8B, 10A-D, and 11A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s) 1410, 1415. The memory 1420, 1425 stores software 1480 implementing one or more innovations described herein, in the form of computer-executable instructions suitable for execution by the processing unit(s) 1410, 1415. The memory 1420, 1425, may also store settings or settings characteristics, databases, data sets, interfaces, displays, or data models or representations shown in FIGS. 1-7, 8B, 10A-D, and 11A-C, systems shown in FIGS. 8A and 12A-C, or the steps of the processes shown in FIGS. 9A-D and 13A-C.

A computing system 1400 may have additional features. For example, the computing system 1400 includes storage 1440, one or more input devices 1450, one or more output devices 1460, and one or more communication connections 1470. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing system 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing system 1400. The output device(s) 1460 may be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 15—Cloud Computing Environment

Figure 15:
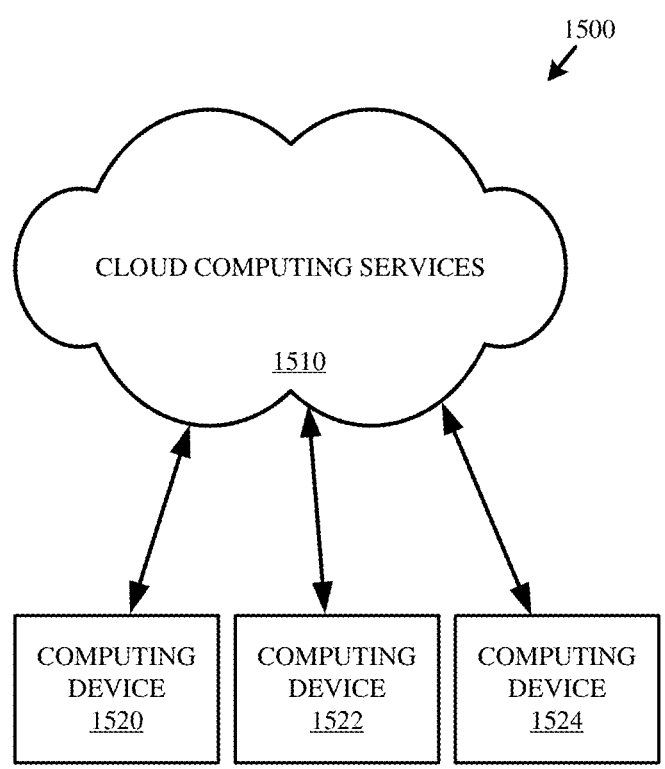
FIG. 15 is an example cloud computing environment that can be used in conjunction with the technologies described herein.

FIG. 15 depicts an example cloud computing environment 1500 in which the described technologies can be implemented. The cloud computing environment 1500 comprises cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 are utilized by various types of computing devices (e.g., client computing devices), such as computing devices 1520, 1522, and 1524. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operations (e.g., data processing, data storage, and the like).

Example 16—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 14, computer-readable storage media include memory 1420 and 1425, and storage 1440. The term computer-readable storage media does not include signals and carrier waves. In addition, the term computer-readable storage media does not include communication connections (e.g., 1470).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented in a computing system comprising at least one hardware processor and at least one memory coupled to the at least one hardware processor, the method comprising:

receiving a first representation of a database model comprising a plurality of database object, wherein the first representation comprises a plurality of nodes and edges between the nodes, wherein at least a portion of the nodes of the plurality of nodes represent database tables and at least a portion of the edges between nodes of the plurality of nodes represent foreign key relationships;

determining edge betweenness values for the respective nodes in the plurality of nodes in the first representation, wherein determining a given edge betweenness value for a given node of the plurality of nodes comprises:

for all pairs of nodes that do not include the given node, determining a number of shortest paths between the nodes of the pairs of nodes that comprise the given node;

for all pairs of nodes that do not include the given node, determining a number of shortest paths between the nodes of the pairs of nodes;

summing the ratio of the number of shortest paths that include the given node to the number of shortest paths for all the pairs of nodes that do not include the given node;

identifying a least one node of the plurality of nodes as a linking node, wherein the linking node has the highest edge betweenness value of the plurality of nodes and connects a first subset of nodes of the plurality of nodes to a second subset of nodes of the plurality of nodes;

remove one or more linking nodes from the plurality of nodes, wherein the first subset of nodes forms a first cluster and the second subset of nodes forms a second cluster;

calculate a plurality of degrees for the respective remaining nodes, wherein a given degree is a number of nodes connected to the given node;

identifying a first hub node for the first cluster, wherein the first hub node has the highest degree of the nodes within the first cluster;

identifying a second hub node for the second cluster, wherein the second hub node has the highest degree of the nodes within the second cluster;

generating a first name for the first cluster based on the first hub node;

generating a second name for the second cluster based on the second hub node; and storing a clustered representation of the first representation comprising the first cluster, the second cluster, the first name, and the second name.

2. The method of claim 1, further comprising:
mapping the clustered representation to a second database representation, wherein the mapping comprises matching the first cluster to one or more first objects in the second database representation and matching the second cluster to one or more second objects in the second database representation.

3. The method of claim 1, further comprising, in a distributed database system comprising a plurality of servers:
identifying a first table of a database represented by the first representation, wherein the first table is associated with the first cluster;
identifying a second table of the database represented by the first representation, wherein the second table is associated with the first cluster;
storing the first table and the second table on a first server of the plurality of servers based on the first cluster.

4. The method of claim 1, further comprising:
providing the clustered representation to a user;
receiving a command to store the clustered representation or to repeat the method using the clustered representation.

5. The method of claim 1, further comprising:
repeating the method with the clustered representation to generate a second clustered representation;
providing the clustered representation and the second clustered representation to a user;
receiving a command to store the clustered representation, the second clustered representation, or to repeat the method using the second clustered representation.

6. The method of claim 1, further comprising:
providing the first representation to a user;
receiving a selection of a linking node, wherein the linking node is of the plurality of nodes;
repeating the method using successively generated clustered representations until the selected linking node is identified as a linking node.

7. The method of claim 1, further comprising:
providing the first representation to a user;
receiving a selection of a hub node, wherein the hub node is of the plurality of nodes;
repeating the method using successively generated clustered representations until the selected hub node is identified as a hub node.

8. The method of claim 1, wherein the edge betweenness values are calculated and identified linking nodes are removed iteratively until a stopping criterion is met.

9. One or more non-transitory computer-readable storage media comprising:
computer-executable instructions that, when executed by a computing system comprising at least one hardware processor and at least one memory coupled to the at least one hardware processor, cause the computing system to receive a first representation of a database model, wherein the first representation comprises a plurality of nodes and edges between the nodes;
computer-executable instructions that, when executed by the computing system, cause the computing system to determine edge betweenness values for the respective nodes in the plurality of nodes in the first representation, wherein determining a given edge betweenness value for a given node of the plurality of nodes is based on a number of shortest paths between other nodes which include the given node;
computer-executable instructions that, when executed by the computing system, cause the computing system to identify at least one node of the plurality of nodes as a linking node based on the edge betweenness values of the plurality of nodes, wherein the linking node connects a first subset of nodes of the plurality of nodes to a second subset of nodes of the plurality of nodes;
computer-executable instructions that, when executed by the computing system, cause the computing system to remove one or more linking nodes from the plurality of nodes, wherein the first subset of nodes forms a first cluster and the second subset of nodes forms a second cluster, and wherein a given linking node of the one or more linking nodes is linked with at least one node in the first cluster and is linked with at least one node in the second cluster;
computer-executable instructions that, when executed by the computing system, cause the computing system to calculate a plurality of degrees for the respective remaining nodes, wherein a given degree is a number of nodes connected to the given node;

computer-executable instructions that, when executed by the computing system, cause the computing system to identify a first hub node for the first cluster, wherein the first hub node has the highest degree of the nodes within the first cluster;

computer-executable instructions that, when executed by the computing system, cause the computing system to identify a second hub node for the second cluster, wherein the second hub node has the highest degree of the nodes within the second cluster;

computer-executable instructions that, when executed by the computing system, cause the computing system to generate a first description for the first cluster based on the first hub node;

computer-executable instructions that, when executed by the computing system, cause the computing system to generate a second description for the second cluster based on the second hub node; and computer-executable instructions that, when executed by the computing system, cause the computing system to store a clustered representation of the first representation comprising the first cluster, the second cluster, the first description, and the second description.

10. The one or more non-transitory computer-readable storage media of claim 9, further comprising:
computer-executable instructions that, when executed by the computing system, cause the computing system to map the clustered representation to a second database representation, wherein the mapping comprises matching the first cluster to one or more first objects in the second database representation and matching the second cluster to one or more second objects in the second database representation.

11. The one or more non-transitory computer-readable storage media of claim 9, further comprising:
computer-executable instructions that, when executed by the computing system, cause the computing system to, in a distributed database system comprising a plurality of servers, identify a first table of a database represented by the first representation, wherein the first table is associated with the first cluster;
computer-executable instructions that, when executed by the computing system, cause the computing system to identify a second table of the database represented by the first representation, wherein the second table is associated with the first cluster;
computer-executable instructions that, when executed by the computing system, cause the computing system to store the first table and the second table on a first server of the plurality of servers based on the first cluster.

12. The one or more non-transitory computer-readable storage media of claim 9, further comprising:
computer-executable instructions that, when executed by the computing system, cause the computing system to provide the clustered representation to a user, wherein providing the clustered representation comprises displaying the clustered representation using the first description for displaying the first cluster and the second description for displaying the second cluster;
computer-executable instructions that, when executed by the computing system, cause the computing system to receive a command to store the clustered representation or to repeat the method using the clustered representation.

13. The one or more non-transitory computer-readable storage media of claim 9, further comprising:

computer-executable instructions that, when executed by the computing system, cause the computing system to repeat the operations of the computer-executable instructions of claim 9 with the clustered representation to generate a second clustered representation;

computer-executable instructions that, when executed by the computing system, cause the computing system to prove the clustered representation and the second clustered representation to a user, wherein providing the clustered representation and the second clustered representation respectively comprise displaying their respective descriptions;

computer-executable instructions that, when executed by the computing system, cause the computing system to receive a command to store the clustered representation, the second clustered representation, or to repeat the method using the second clustered representation.

14. The one or more non-transitory computer-readable storage media of claim 9, further comprising:
computer-executable instructions that, when executed by the computing system, cause the computing system to provide the first representation to a user;
computer-executable instructions that, when executed by the computing system, cause the computing system to receive a selection of a linking node or a hub node, wherein the linking node or the hub node is of the plurality of nodes;
computer-executable instructions that, when executed by the computing system, cause the computing system to repeat the computer executable instructions using successively generated clustered representations until the selected linking node is identified as a linking node or the selected hub node is identified as a hub node.

15. The one or more non-transitory computer-readable storage media of claim 9, wherein the computer-executable instructions that store the clustered representation comprise:
computer-executable instructions that, when executed by the computing system, cause the computing system to store the clustered representation in a metadata structure or a metadata schema for data object mapping.

16. The one or more non-transitory computer-readable storage media of claim 9, further comprising:
computer-executable instructions that, when executed by the computing system, cause the computing system to display the clustered representation, wherein the first cluster is displayed at least in part via the first description and the second cluster is displayed at least in part via the second description.

17. The one or more non-transitory computer-readable storage media of claim 9, wherein at least a portion of the nodes of the plurality of nodes represent database tables.

18. The one or more non-transitory computer-readable storage media of claim 9, wherein at least a portion of the edges between nodes of the plurality of nodes represent foreign key relationships.

19. A system comprising:
one or more memories;
one or more hardware processing units coupled to the one or more memories; and
one or more computer-readable storage media storing computer-executable instructions that, when executed, cause the system to perform operations comprising:
receiving a first graph of a data model, wherein the first graph comprises a plurality of nodes and edges between the nodes;
determining edge betweenness values for the respective nodes in the plurality of nodes in the first graph, wherein a given edge betweenness value for a given node is based on a number of shortest paths between other nodes which include the given node;

identifying a linking node of the plurality of nodes based on the edge betweenness values of the plurality of nodes;

removing the linking node from the plurality of nodes to form a first cluster of nodes and a second cluster of nodes, wherein the linking node is linked with at least one node in the first cluster of nodes and is linked with at least one node in the second cluster of nodes;

calculating a plurality of degrees for the respective remaining nodes, wherein a given degree is a number of nodes connected to the given node;

identifying respective hub nodes for the respective first cluster and second cluster, wherein a given hub node has the highest degree of the nodes within the respective cluster;

generating respective descriptions for the respective clusters based on their respective hub nodes; and storing a clustered graph of the first graph comprising the first cluster, the second cluster, and their respective descriptions.

20. The system of claim 19, the operations further comprising:

mapping the clustered graph to a second graph, wherein the mapping comprises matching the first cluster to one or more first nodes in the second graph and matching the second cluster to one or more second nodes in the second graph.

21. The system of claim 19, the operations further comprising:

identifying a first table of a database represented as a node in the first graph, wherein the first table is associated with the first cluster;

identifying a second table of the database represented as a node in the first graph, wherein the second table is associated with the first cluster;

storing the first table and the second table on a first server based on the first cluster.

22. The system of claim 19, wherein the edge betweenness values are calculated and identified linking nodes are removed iteratively until a stopping criterion is met.

23. The system of claim 19, wherein at least a portion of the nodes of the plurality of nodes represent database tables.

24. The system of claim 19, wherein at least a portion of the edges between nodes of the plurality of nodes represent foreign key relationships.

* * * * *